US007809525B2

(12) United States Patent
Chagoly et al.

(10) Patent No.: US 7,809,525 B2
(45) Date of Patent: Oct. 5, 2010

(54) AUTOMATIC CONFIGURATION OF ROBOTIC TRANSACTION PLAYBACK THROUGH ANALYSIS OF PREVIOUSLY COLLECTED TRAFFIC PATTERNS

(75) Inventors: Bryan Christopher Chagoly, Austin, TX (US); Byron Christian Gehman, Round Rock, TX (US); Andrew Jason Lavery, Austin, TX (US); Sandra Lee Tipton, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 439 days.

(21) Appl. No.: 11/830,896

(22) Filed: Jul. 31, 2007

(65) Prior Publication Data

US 2009/0037914 A1 Feb. 5, 2009

(51) Int. Cl.
*G06F 11/30* (2006.01)
*G21C 17/00* (2006.01)
(52) U.S. Cl. ...................... 702/182; 702/186
(58) Field of Classification Search ............ 702/85, 702/108, 182, 183, 185, 186, 189; 700/108–110; 703/13, 21, 22, 26; 705/64, 75; 709/217, 709/219, 221, 223–225, 231, 232
See application file for complete search history.

(56) References Cited

U.S. PATENT DOCUMENTS

| 7,506,047 B2 * | 3/2009 | Wiles, Jr. ............... 709/224 |
| 2003/0055883 A1 * | 3/2003 | Wiles, Jr. ............... 709/203 |
| 2004/0267820 A1 | 12/2004 | Boss et al. |
| 2006/0085537 A1 | 4/2006 | Dickerson et al. |
| 2006/0287948 A1 | 12/2006 | Ernst |
| 2008/0065702 A1 * | 3/2008 | Dickerson et al. ........... 707/202 |
| 2008/0133210 A1 * | 6/2008 | Chagoly et al. ............... 703/22 |
| 2009/0177692 A1 | 7/2009 | Chagoly |
| 2009/0240765 A1 * | 9/2009 | Wiles, Jr. ..................... 709/203 |

OTHER PUBLICATIONS

International Business Machines, "Tivoli Composite Application Manager for Response Time Tracking Administrator's Guide", Version 6.1, updated Jan. 2007.
The Open Group, Berkshire, UK, "Technical Standard: Systems Management: Application Response Measurement (ARM) API" published in Jul. 1998.

(Continued)

*Primary Examiner*—Michael P Nghiem
(74) *Attorney, Agent, or Firm*—Robert H. Frantz; Jeffrey S. LaBaw

(57) ABSTRACT

A system or method which accesses or otherwise receives collected performance data for at least one server application, where the server application is capable of performing a plurality of transactions with client devices and the client devices are geographically dispersed from the server in known geographical locales, which automatically determines from the performance data which of the transactions are utilized by users of the client devices, which selects utilized transactions according to at least one pre-determined selection criteria, which automatically generates a transaction playback script for each of the selected transactions substituting test information in place of user-supplied or user-unique information in the transactions, which designates each script for execution from a geographical locale corresponding to the locale of the clients which execute the utilized transactions, which deploys the playback scripts to robotic agents geographically co-located with client devices according to the locale designation, and which executes the playback scripts.

21 Claims, 14 Drawing Sheets

OTHER PUBLICATIONS

International Business Machines, "IBM Tivoli Composite Application Manager for WebSphere", Downloaded on May 31, 2007 from: ftp://ftp.software.ibm.com/software/tivoli/datasheets/ds-tcam-for-websphere.pdf.

* cited by examiner

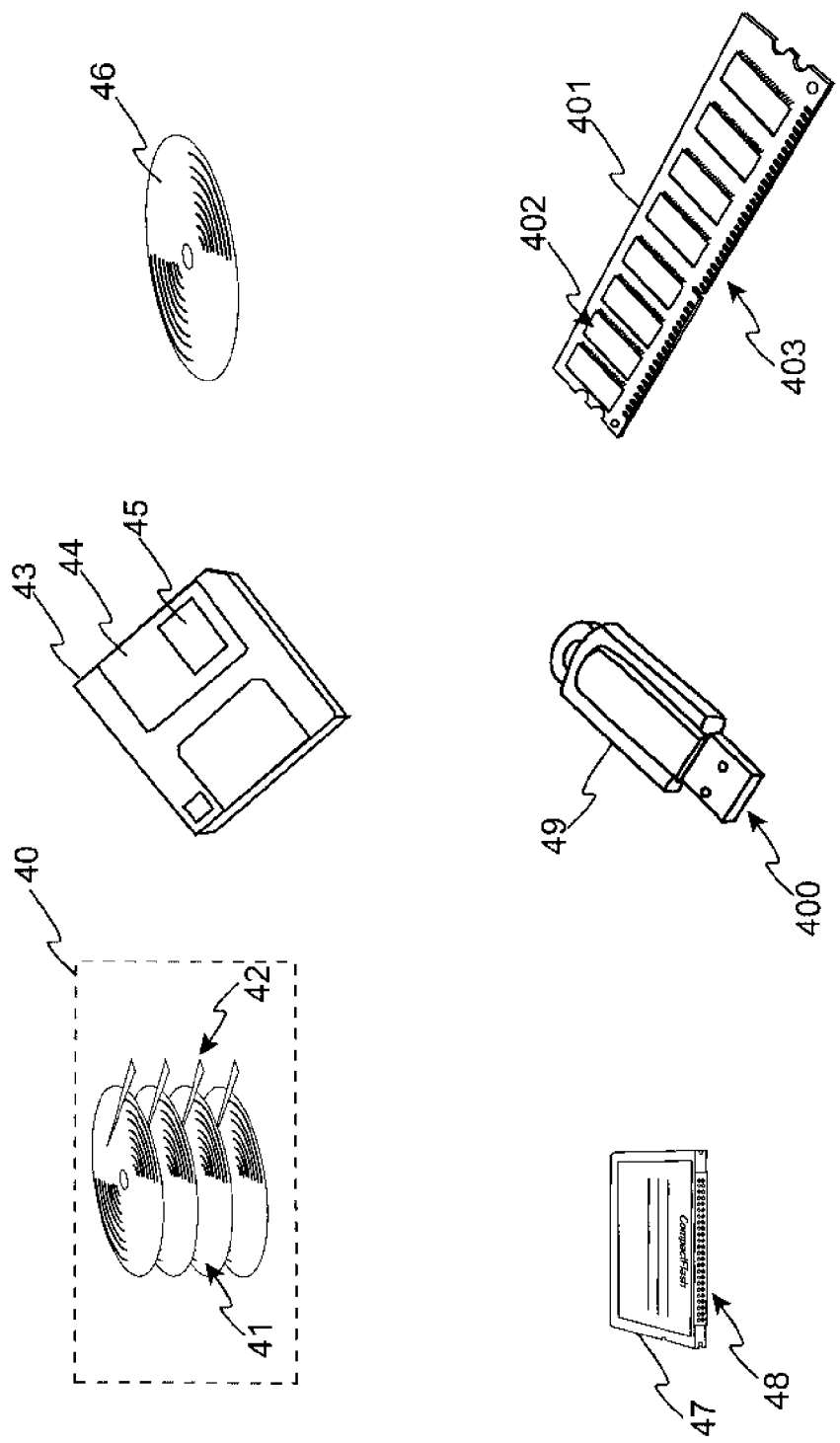

US 7,809,525 B2

AUTOMATIC CONFIGURATION OF ROBOTIC TRANSACTION PLAYBACK THROUGH ANALYSIS OF PREVIOUSLY COLLECTED TRAFFIC PATTERNS

CROSS-REFERENCE TO RELATED APPLICATIONS (CLAIMING BENEFIT UNDER 35 U.S.C. 120)

None.

FEDERALLY SPONSORED RESEARCH AND DEVELOPMENT STATEMENT

This invention was not developed in conjunction with any Federally sponsored contract.

MICROFICHE APPENDIX

Not applicable.

INCORPORATION BY REFERENCE

Non-patent literature "Tivoli Composite Application Manager for Response Time Tracking Administrator's Guide" Version 6.1, updated January, 2007, published by International Business Machines Corp., Armonk, N.Y., and non-patent literature "Technical Standard: Systems Management: Application Response Measurement (ARM) API" published in July, 1998, by The Open Group, Berkshire, UK, is incorporated by reference herein in its entirety.

BACKGROUND OF THE INVENTION

1. Field of the Invention

The present invention relates generally to systems and methods for simulating complex client-server transactions which mimic real transactions during realistic time periods and initiated from realistic geographies over actual network topologies.

2. Background of the Invention

Whereas the determination of a publication, technology, or product as prior art relative to the present invention requires analysis of certain dates and events not disclosed herein, no statements made within this Background of the Invention shall constitute an admission by the Applicants of prior art unless the term "Prior Art" is specifically stated. Otherwise, all statements provided within this Background section are "other information" related to or useful for understanding the invention.

Many online commerce services are provided in a generalized client-server arrangement wherein client devices are interconnected to one or more server systems via one or more computer networks. The client devices, such as personal computers and web-enabled cell phones, are often geographically separated from the server(s), such that when a transaction, such as booking a flight reservation, ordering a book from an online bookstore, or accessing an online bank account, is performed, many modules of software on the client and at the server(s) are executed, and many links of network, including protocol conversions, error corrections, etc., are utilized.

As application programs on servers become more and more complex re-using modules of software from other programs, as client devices become more capable and thus more complex in their own configurations, and as networks become more interconnected and advanced, it becomes increasing likely that a problem or error will occur during such a transaction. Similarly, it has become increasingly more difficult to determine the source of each error, to replicate each error, and to correct each error.

Many tools have been developed to simulate user transactions in client-server arrangements, both for lab use, and for use in the field. However, many problems still remain elusive due to limitations of these tools and the technologies they employ, which continues to result in high labor costs and high loss-of-opportunity costs when a user is unable to complete a commercial transaction.

SUMMARY OF THE INVENTION

A system or method which accesses or otherwise receives collected performance data for at least one server application, where the server application is capable of performing a plurality of transactions with client devices and the client devices are geographically dispersed from the server in known geographical locales, which automatically determines from the performance data which of the transactions are utilized by users of the client devices, which selects utilized transactions according to at least one pre-determined selection criteria, which automatically generates a transaction playback script for each of the selected transactions substituting test information in place of user-supplied or user-unique information in the transactions, which designates each script for execution from a geographical locale corresponding to the locale of the clients which execute the utilized transactions, which deploys the playback scripts to robotic agents geographically co-located with client devices according to the locale designation, and which executes the playback scripts.

BRIEF DESCRIPTION OF THE DRAWINGS

The following detailed description when taken in conjunction with the figures presented herein provide a complete disclosure of the invention.

FIGS. 4a, 4b and 4c, illustrate computer readable media of various removable and fixed types, signal transceivers, and parallel-to-serial-to-parallel signal circuits.

DETAILED DESCRIPTION OF THE INVENTION

Figure 1A:
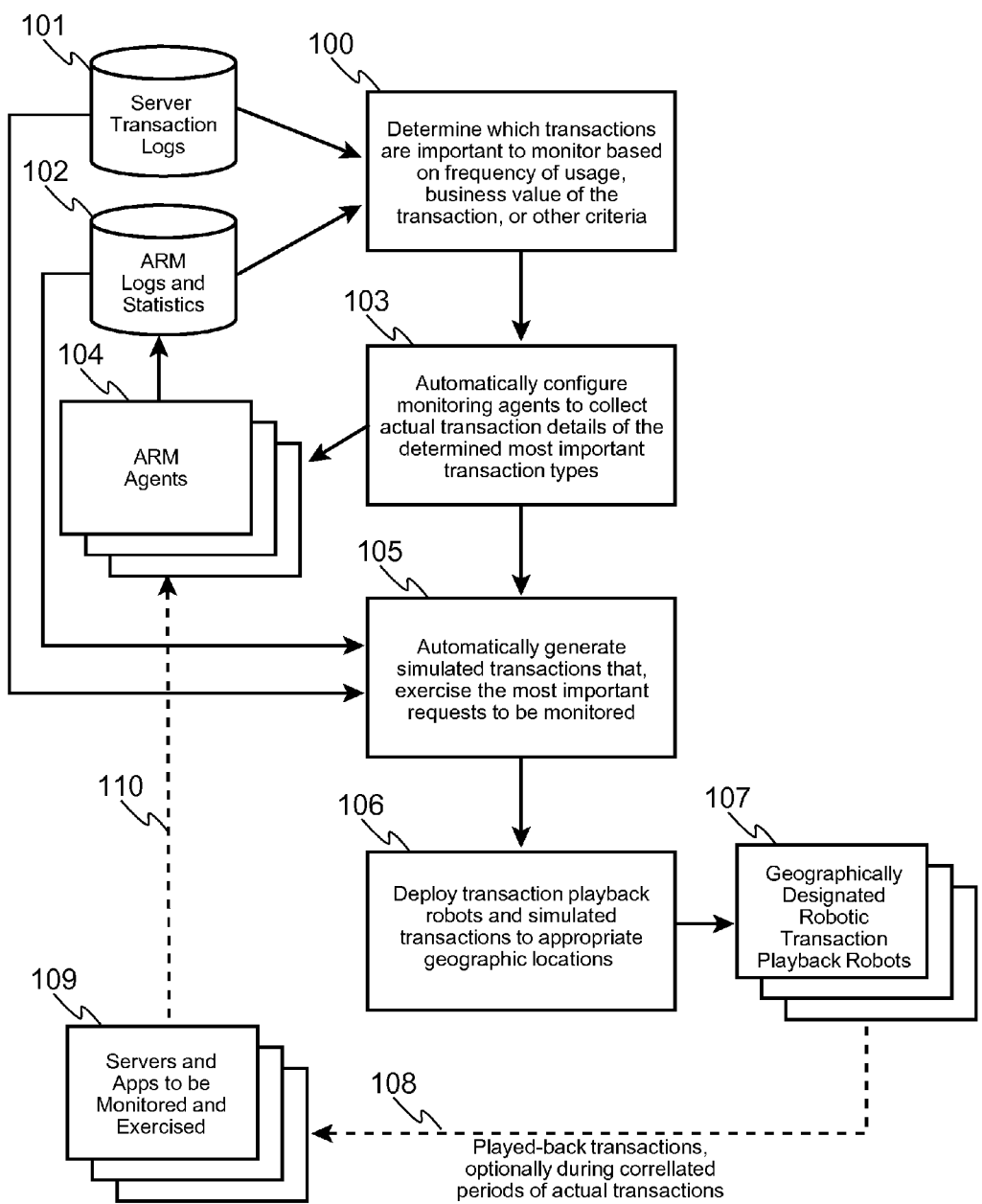
FIGS. 1a and 1b set forth logical processes according to the invention.

Recognition of Unaddressed Problem in the Art, and Conceptual Overview of the Invention The inventors of the present invention have recognized and solved problems previously unrecognized by others in the art of for simulating complex client-server transactions which mimic real transactions during realistic time periods and initiated from realistic geographies over actual network topologies. Existing monitoring agents in transaction-based client-server arrangements are able to be deployed to remote agents, and are able to execute a sequence of transactions from those remote clients to exercise a server or server application. This operates not only the software and hardware functions of the server(s) and the client(s), but also exercises the network topology which exists between the servers and the clients. Periodically executing these transactions by the client-robot allows the users and the suppliers to verify that quality of service is consistent, and to detect problems.

However, these robotic transaction sequences have been manually designed up to this point. This requires a user or administrator to determine from his or her own best knowledge which transactions are most important, and then to know every detail of each step of the transaction to complete. For example, to exercise a portion of an online banking application, the sequence which must be known by an administrator wishing to write a robot exercise script may include the steps of go to a login page, enter a username, enter a password, click on "login", click on "view account details", click on "sort by date of account item", enter a starting date, enter an ending date, etc.

It has been recognized by the inventors of the present invention that the transaction monitoring data collected by an application response monitoring can be used to automatically determine which transactions are most important or most utilized and when those transactions are typically accessed, to automatically generate a robotic script according to the determined most important transactions, to automatically deploy the scripts to robotic agents which are located in geographical locales representing the clients from which their transactions are typically performed, and to execute those scripts to robotically exercise the client-server arrangement in the manners most important at the most appropriate, realistic times. One such application response monitoring system is the IBM Tivoli Composite Application Monitor ("ITCAM") for Response Time Tracking ("RTT"), from which transaction performance data can be obtained using the well-known Application Response Monitor ("ARM") application programming interface ("API"). However, the present invention is not limited to implementation with, or integration to ITCAM through ARM, whereas it can be utilized in conjunction with any suitable application performance monitoring system. While one embodiment utilizes the ARM API to collect monitoring data, other alternatives exist. For example, another component known as IBM Tivoli™ Web Response Monitor ("WRM") "sniffs" IP packets to collect this real user web traffic, and writes that information into a log file. So, the invention can alternatively read and interpret an WRM log. Alternative products and tools from other suppliers can be used for this function, as well. Further, IBM Tivoli's more recent version of ITCAM for RTT, known as ITCAM for Response Time v6.2 ("ITCAM for RT"), may be alternatively employed.

Suitable Computing Platform

Whereas at least one embodiment of the present invention incorporates, uses, or operates on, with, or through one or more computing platforms, and whereas many devices, even purpose-specific devices, are actually based upon computing platforms of one type or another, it is useful to describe a suitable computing platform, its characteristics, and its capabilities.

Therefore, it is useful to review a generalized architecture of a computing platform which may span the range of implementation, from a high-end web or enterprise server platform, to a personal computer, to a portable PDA or wireless phone.

In one embodiment of the invention, the functionality including the previously described logical processes are performed in part or wholly by software executed by a computer, such as personal computers, web servers, web browsers, or even an appropriately capable portable computing platform, such as personal digital assistant ("PDA"), web-enabled wireless telephone, or other type of personal information management ("PIM") device. In alternate embodiments, some or all of the functionality of the invention are realized in other logical forms, such as circuitry.

Figure 2A:
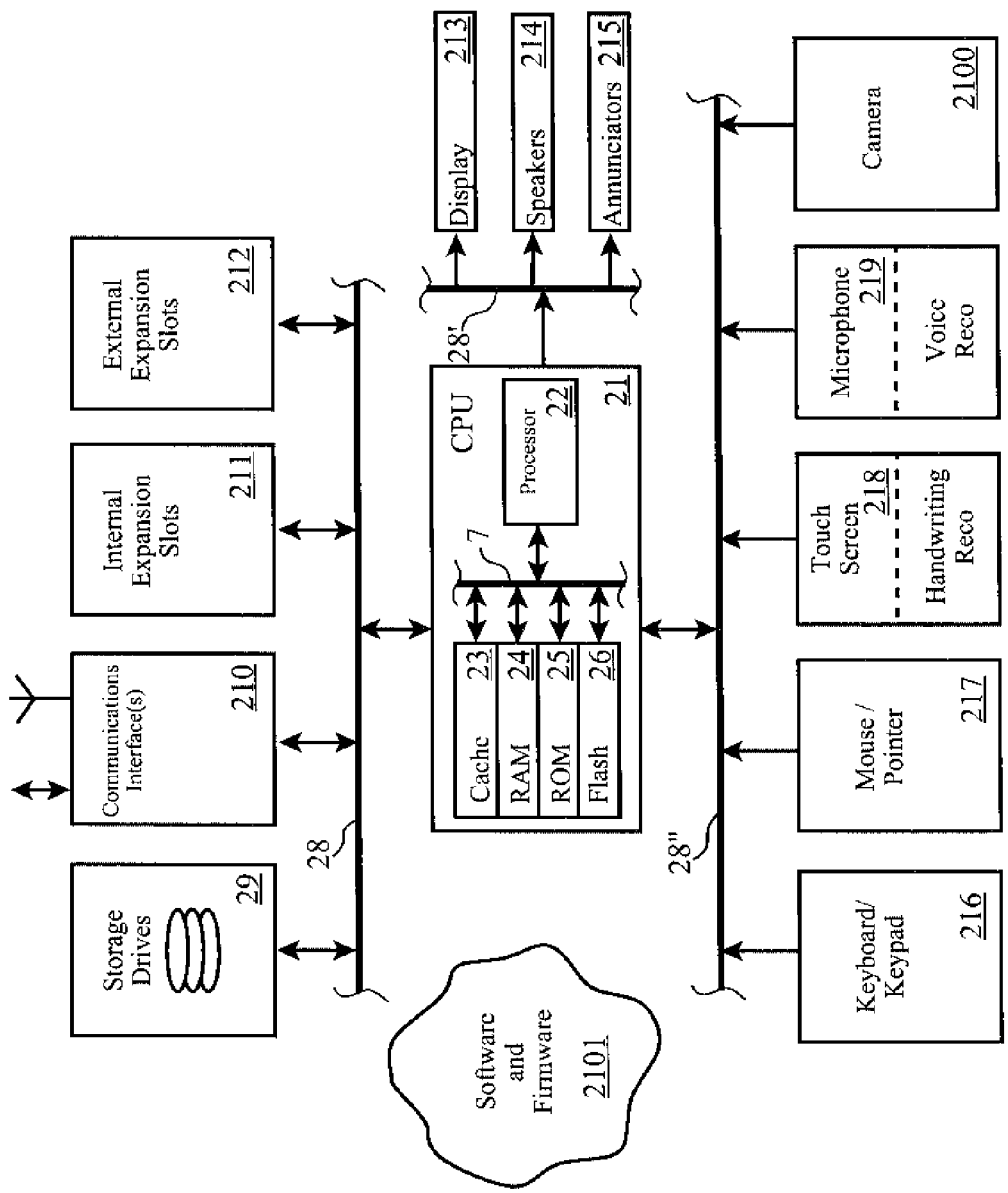
FIGS. 2a and 2b show a generalized computing platform architecture, and a generalized organization of software and firmware of such a computing platform architecture.

Turning to FIG. 2a, a generalized architecture is presented including a central processing unit (21) ("CPU"), which is typically comprised of a microprocessor (22) associated with random access memory ("RAM") (24) and read-only memory ("ROM") (25). Often, the CPU (21) is also provided with cache memory (23) and programmable FlashROM (26). The interface (27) between the microprocessor (22) and the various types of CPU memory is often referred to as a "local bus", but also may be a more generic or industry standard bus.

Many computing platforms are also provided with one or more storage drives (29), such as hard-disk drives ("HDD"), floppy disk drives, compact disc drives (CD, CD-R, CD-RW, DVD, DVD-R, etc.), and proprietary disk and tape drives (e.g., Iomega Zip™ and Jaz™, Addonics SuperDisk™, etc.). Additionally, some storage drives may be accessible over a computer network.

Many computing platforms are provided with one or more communication interfaces (210), according to the function intended of the computing platform. For example, a personal computer is often provided with a high speed serial port (RS-232, RS-422, etc.), an enhanced parallel port ("EPP"), and one or more universal serial bus ("USB") ports. The computing platform may also be provided with a local area network ("LAN") interface, such as an Ethernet card, and other high-speed interfaces such as the High Performance Serial Bus IEEE-1394.

Computing platforms such as wireless telephones and wireless networked PDA's may also be provided with a radio frequency ("RF") interface with antenna, as well. In some cases, the computing platform may be provided with an infrared data arrangement ("IrDA") interface, too.

Computing platforms are often equipped with one or more internal expansion slots (211), such as Industry Standard Architecture ("ISA"), Enhanced Industry Standard Architecture ("EISA"), Peripheral Component Interconnect ("PCI"), or proprietary interface slots for the addition of other hardware, such as sound cards, memory boards, and graphics accelerators.

Additionally, many units, such as laptop computers and PDA's, are provided with one or more external expansion slots (212) allowing the user the ability to easily install and remove hardware expansion devices, such as PCMCIA cards, SmartMedia cards, and various proprietary modules such as removable hard drives, CD drives, and floppy drives.

Often, the storage drives (29), communication interfaces (210), internal expansion slots (211) and external expansion slots (212) are interconnected with the CPU (21) via a standard or industry open bus architecture (28), such as ISA, EISA, or PCI. In many cases, the bus (28) may be of a proprietary design.

A computing platform is usually provided with one or more user input devices, such as a keyboard or a keypad (216), and mouse or pointer device (217), and/or a touch-screen display (218). In the case of a personal computer, a full size keyboard is often provided along with a mouse or pointer device, such as a track ball or TrackPoint™. In the case of a web-enabled wireless telephone, a simple keypad may be provided with one or more function-specific keys. In the case of a PDA, a touch-screen (218) is usually provided, often with handwriting recognition capabilities.

Additionally, a microphone (219), such as the microphone of a web-enabled wireless telephone or the microphone of a personal computer, is supplied with the computing platform. This microphone may be used for simply reporting audio and voice signals, and it may also be used for entering user choices, such as voice navigation of web sites or auto-dialing telephone numbers, using voice recognition capabilities.

Many computing platforms are also equipped with a camera device (2100), such as a still digital camera or full motion video digital camera.

One or more user output devices, such as a display (213), are also provided with most computing platforms. The display (213) may take many forms, including a Cathode Ray Tube ("CRT"), a Thin Flat Transistor ("TFT") array, or a simple set of light emitting diodes ("LED") or liquid crystal display ("LCD") indicators.

One or more speakers (214) and/or annunciators (215) are often associated with computing platforms, too. The speakers (214) may be used to reproduce audio and music, such as the speaker of a wireless telephone or the speakers of a personal computer. Annunciators (215) may take the form of simple beep emitters or buzzers, commonly found on certain devices such as PDAs and PIMs.

These user input and output devices may be directly interconnected (28', 28") to the CPU (21) via a proprietary bus structure and/or interfaces, or they may be interconnected through one or more industry open buses such as ISA, EISA, PCI, etc. The computing platform is also provided with one or more software and firmware (2101) programs to implement the desired functionality of the computing platforms.

Figure 2B:
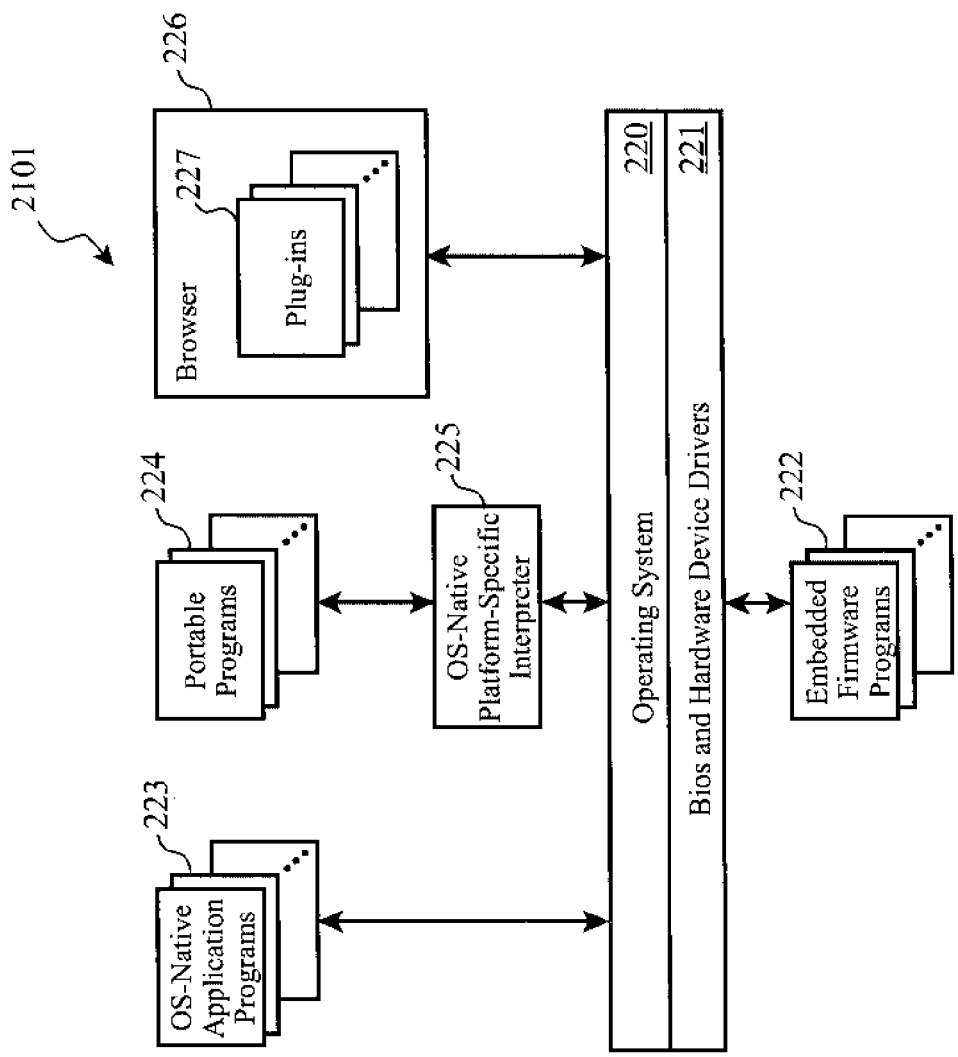

Turning to now FIG. 2b, more detail is given of a generalized organization of software and firmware (2101) on this range of computing platforms. One or more operating system ("OS") native application programs (223) may be provided on the computing platform, such as word processors, spreadsheets, contact management utilities, address book, calendar, email client, presentation, financial and bookkeeping programs.

Additionally, one or more "portable" or device-independent programs (224) may be provided, which must be interpreted by an OS-native platform-specific interpreter (225), such as Java™ scripts and programs.

Often, computing platforms are also provided with a form of web browser or micro-browser (226), which may also include one or more extensions to the browser such as browser plug-ins (227).

The computing device is often provided with an operating system (220), such as Microsoft Windows™, UNIX, IBM OS/2™, IBM AIX™, open source LINUX, Apple's MAC OS™, or other platform specific operating systems. Smaller devices such as PDA's and wireless telephones may be equipped with other forms of operating systems such as real-time operating systems ("RTOS") or Palm Computing's PalmOS™.

A set of basic input and output functions ("BIOS") and hardware device drivers (221) are often provided to allow the operating system (220) and programs to interface to and control the specific hardware functions provided with the computing platform.

Additionally, one or more embedded firmware programs (222) are commonly provided with many computing platforms, which are executed by onboard or "embedded" microprocessors as part of the peripheral device, such as a micro controller or a hard drive, a communication processor, network interface card, or sound or graphics card.

As such, FIGS. 2a and 2b describe in a general sense the various hardware components, software and firmware programs of a wide variety of computing platforms, including but not limited to personal computers, PDAs, PIMs, web-enabled telephones, and other appliances such as WebTV™ units. As such, we now turn our attention to disclosure of the present invention relative to the processes and methods preferably implemented as software and firmware on such a computing platform. It will be readily recognized by those skilled in the art that the following methods and processes may be alternatively realized as hardware functions, in part or in whole, without departing from the spirit and scope of the invention.

Computer-Readable Media Embodiments

In another embodiment of the invention, logical processes according to the invention and described herein are encoded on or in one or more computer-readable media. Some computer-readable media are read-only (e.g. they must be initially programmed using a different device than that which is ultimately used to read the data from the media), some are write-only (e.g. from the data encoders perspective they can only be encoded, but not read simultaneously), or read-write. Still some other media are write-once, read-many-times.

Some media are relatively fixed in their mounting mechanisms, while others are removable, or even transmittable. All computer-readable media form two types of systems when encoded with data and/or computer software: (a) when removed from a drive or reading mechanism, they are memory devices which generate useful data-driven outputs when stimulated with appropriate electromagnetic, electronic, and/or optical signals; and (b) when installed in a drive or reading device, they form a data repository system accessible by a computer.

FIG. 4a illustrates some computer readable media including a computer hard drive (40) having one or more magnetically encoded platters or disks (41), which may be read, written, or both, by one or more heads (42). Such hard drives are typically semi-permanently mounted into a complete drive unit, which may then be integrated into a configurable computer system such as a Personal Computer, Server Computer, or the like.

Similarly, another form of computer readable media is a flexible, removable "floppy disk" (43), which is inserted into a drive which houses an access head. The floppy disk typically includes a flexible, magnetically encodable disk which is accessible by the drive head through a window (45) in a sliding cover (44).

A Compact Disk ("CD") (46) is usually a plastic disk which is encoded using an optical and/or magneto-optical process, and then is read using generally an optical process. Some CD's are read-only ("CD-ROM"), and are mass produced prior to distribution and use by reading-types of drives. Other CD's are writable (e.g. "CD-RW", "CD-R"), either once or many time. Digital Versatile Disks ("DVD") are advanced versions of CD's which often include double-sided encoding of data, and even multiple layer encoding of data. Like a floppy disk, a CD or DVD is a removable media.

Another common type of removable media are several types of removable circuit-based (e.g. solid state) memory devices, such as Compact Flash ("CF") (47), Secure Data ("SD"), Sony's MemoryStick, Universal Serial Bus ("USB") FlashDrives and "Thumbdrives" (49), and others. These devices are typically plastic housings which incorporate a digital memory chip, such as a battery-backed random access chip ("RAM"), or a Flash Read-Only Memory ("FlashROM"). Available to the external portion of the media is one or more electronic connectors (48, 400) for engaging a connector, such as a CF drive slot or a USB slot. Devices such as a USB FlashDrive are accessed using a serial data methodology, where other devices such as the CF are accessed using a parallel methodology. These devices often offer faster access times than disk-based media, as well as increased reliability and decreased susceptibility to mechanical shock and vibration. Often, they provide less storage capability than comparably priced disk-based media.

Yet another type of computer readable media device is a memory module (403), often referred to as a SIMM or DIMM. Similar to the CF, SD, and FlashDrives, these modules incorporate one or more memory devices (402), such as Dynamic ("DRAM"), mounted on a circuit board (401) having one or more electronic connectors for engaging and interfacing to another circuit, such as a Personal Computer motherboard. These types of memory modules are not usually encased in an outer housing, as they are intended for installation by trained technicians, and are generally protected by a larger outer housing such as a Personal Computer chassis.

Figure 4B:
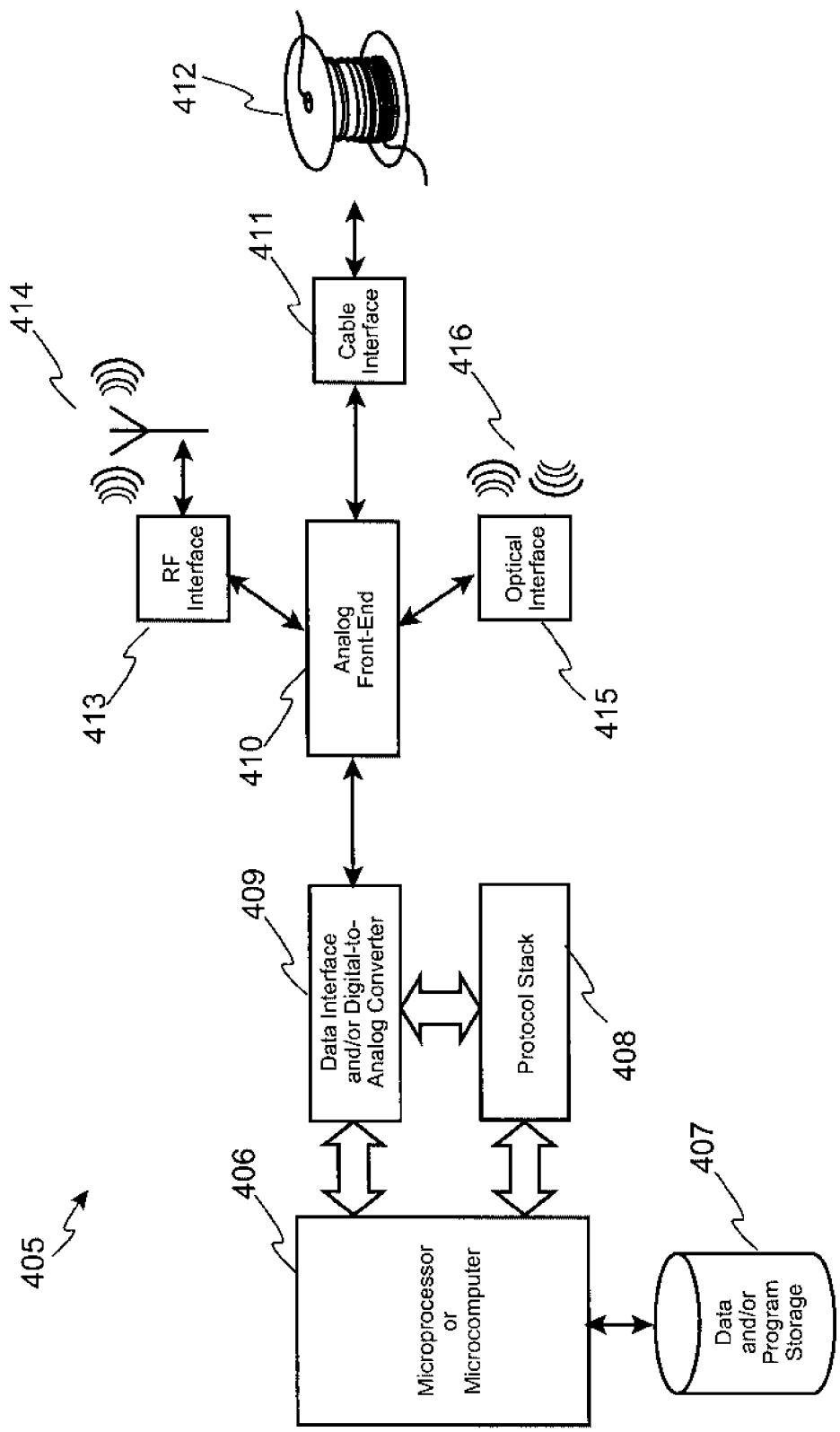

Turning now to FIG. 4b, another embodiment option (405) of the present invention is shown in which a computer-readable signal is encoded with software, data, or both, which implement logical processes according to the invention. FIG. 4b is generalized to represent the functionality of wireless, wired, electro-optical, and optical signaling systems. For example, the system shown in FIG. 4b can be realized in a manner suitable for wireless transmission over Radio Frequencies ("RF"), as well as over optical signals, such as InfraRed Data Arrangement ("IrDA"). The system of FIG. 4b may also be realized in another manner to serve as a data transmitter, data receiver, or data transceiver for a USB system, such as a drive to read the aforementioned USB FlashDrive, or to access the serially stored data on a disk, such as a CD or hard drive platter.

In general, a microprocessor or microcontroller (406) reads, writes, or both, data to/from storage for data, program, or both (407). A data interface (409), optionally including a digital-to-analog converter, cooperates with an optional protocol stack (408), to send, receive, or transceive data between the system front-end (410) and the microprocessor (406). The protocol stack is adapted to the signal type being sent, received, or transceived. For example, in a Local Area Network ("LAN") embodiment, the protocol stack may implement Transmission Control Protocol/Internet Protocol ("TCP/IP"). In a computer-to-computer or computer-to-peripheral embodiment, the protocol stack may implement all or portions of USB, "FireWire", RS-232, Point-to-Point Protocol ("PPP"), etc.

The system's front-end, or analog front-end, is adapted to the signal type being modulated, demodulate, or transcoded. For example, in an RF-based (413) system, the analog front-end comprises various local oscillators, modulators, demodulators, etc., which implement signaling formats such as Frequency Modulation ("FM"), Amplitude Modulation ("AM"), Phase Modulation ("PM"), Pulse Code Modulation ("PCM"), etc. Such an RF-based embodiment typically includes an antenna (414) for transmitting, receiving, or transceiving electromagnetic signals via open air, water, earth, or via RF wave guides and coaxial cable. Some common open air transmission standards are BlueTooth, Global Services for Mobile Communications ("GSM"), Time Division Multiple Access ("TDMA"), Advanced Mobile Phone Service ("AMPS"), and Wireless Fidelity ("Wi-Fi").

In another example embodiment, the analog front-end may be adapted to sending, receiving, or transceiving signals via an optical interface (415), such as laser-based optical interfaces (e.g. Wavelength Division Multiplexed, SONET, etc.), or Infra Red Data Arrangement ("IrDA") interfaces (416). Similarly, the analog front-end may be adapted to sending, receiving, or transceiving signals via cable (412) using a cable interface, which also includes embodiments such as USB, Ethernet, LAN, twisted-pair, coax, Plain-old Telephone Service ("POTS"), etc.

Signals transmitted, received, or transceived, as well as data encoded on disks or in memory devices, may be encoded to protect it from unauthorized decoding and use. Other types of encoding may be employed to allow for error detection, and in some cases, correction, such as by addition of parity bits or Cyclic Redundancy Codes ("CRC"). Still other types of encoding may be employed to allow directing or "routing" of data to the correct destination, such as packet and frame-based protocols.

Figure 4C:
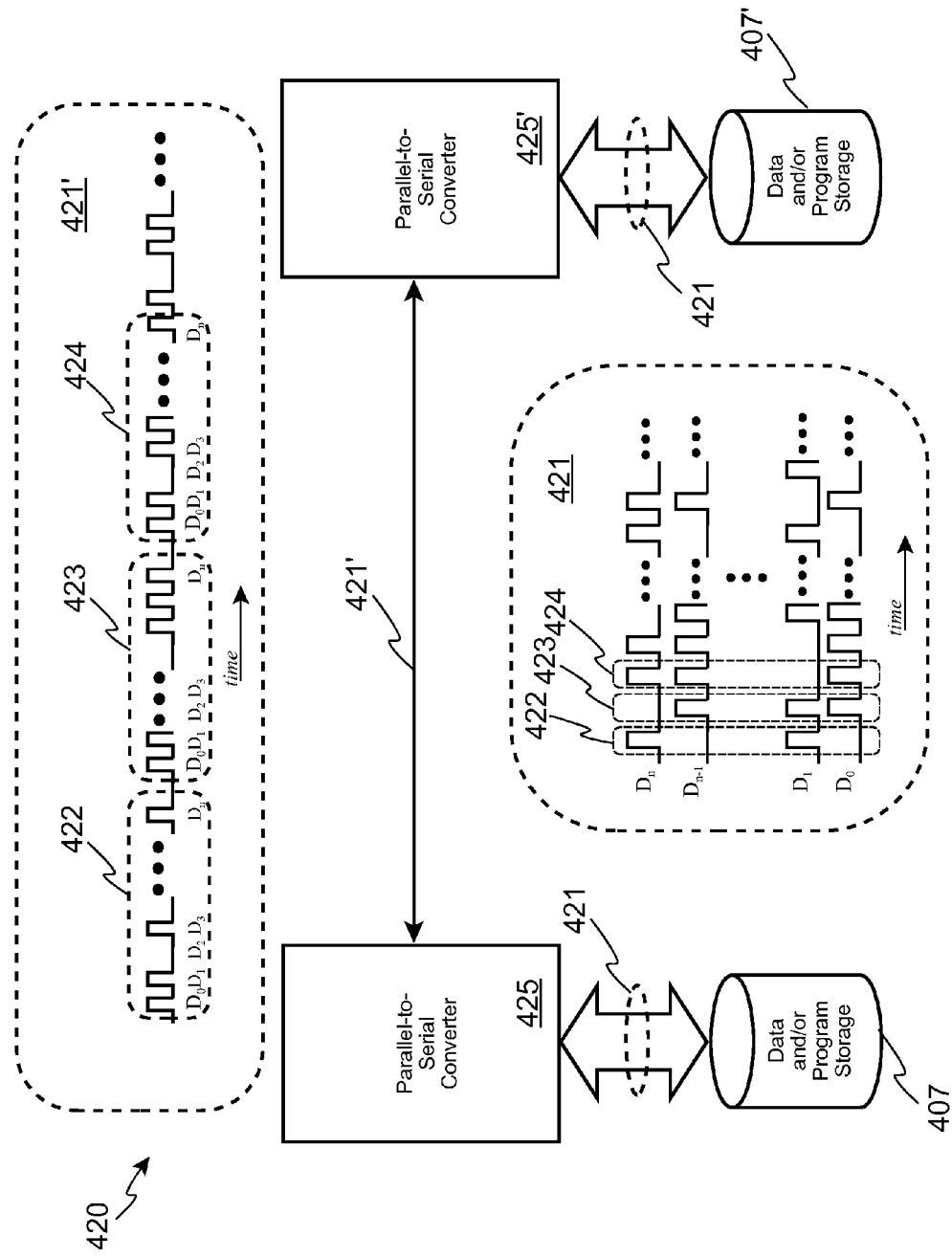

FIG. 4c illustrates conversion systems which convert parallel data to and from serial data. Parallel data is most often directly usable by microprocessors, often formatted in 8-bit wide bytes, 16-bit wide words, 32-bit wide double words, etc. Parallel data can represent executable or interpretable software, or it may represent data values, for use by a computer. Data is often serialized in order to transmit it over a media, such as a RF or optical channel, or to record it onto a media, such as a disk. As such, many computer-readable media systems include circuits, software, or both, to perform data serialization and re-parallelization.

Parallel data (421) can be represented as the flow of data signals aligned in time, such that parallel data unit (byte, word, d-word, etc.) (422, 423, 424) is transmitted with each bit $D_0$-$D_n$ being on a bus or signal carrier simultaneously, where the "width" of the data unit is n−1. In some systems, $D_0$ is used to represent the least significant bit ("LSB"), and in other systems, it represents the most significant bit ("MSB"). Data is serialized (421) by sending one bit at a time, such that each data unit (422, 423, 424) is sent in serial fashion, one after another, typically according to a protocol.

As such, the parallel data stored in computer memory (407, 407') is often accessed by a microprocessor or Parallel-to-Serial Converter (425, 425') via a parallel bus (421), and exchanged (e.g. transmitted, received, or transceived) via a serial bus (421'). Received serial data is converted back into parallel data before storing it in computer memory, usually. The serial bus (421') generalized in FIG. 4c may be a wired bus, such as USB or Firewire, or a wireless communications medium, such as an RF or optical channel, as previously discussed.

In these manners, various embodiments of the invention may be realized by encoding software, data, or both, according to the logical processes of the invention, into one or more computer-readable mediums, thereby yielding a product of manufacture and a system which, when properly read, received, or decoded, yields useful programming instructions, data, or both, including, but not limited to, the computer-readable media types described in the foregoing paragraphs.

General Arrangements of Monitored Transaction Processing Systems

Whereas the generalized embodiment of the present invention utilizes, cooperates with, and operates on or within a transaction processing client-server arrangement, the following figures and paragraphs provide definitions and fundamentals of an embodiment based upon an IBM Tivoli Composite Application Manager for Response Time Tracking ("ITCAM for RTT") platform. Other embodiments of the present invention are possible using alternative platforms to ITCAMM for RTT, and it is within the skill of those in the art to adapt the teachings made herein to such alternate embodiments. Further, while most embodiments described in the following paragraphs will be set forth relative to an exemplary embodiment using Application Response Monitoring ("ARM") and/or Web Response Monitor ("WRM") used with standard hyper text transfer protocol ("HTTP"), it will be readily recognized by those skilled in the art that alternative embodiments within the scope of the invention can utilize other protocols, monitoring schemes, and programming languages, including but not limited to web services over HTTP, Java Messaging Service ("JMS"), Message Queue series ("MQ") messages, Structured Query Language ("SQL"), Java Database Connectivity ("JDBC"), Remote Method Invocation ("RMI"), or any other suitable network based protocol.

ITCAM for RTT. Much of the following information is presented from the Tivoli Composite Application Manager for Response Time Tracking Administrator's Guide, Version 6.1, updated January, 2007, which is incorporated by reference herein.

ITCAM for RTT measures the service level delivered to end users of client devices when they perform transactions with a server system. ITCAM monitors the availability and response time that end users experience at the client desktop or user interface. It can be used with a wide range of web-based, e-business, and Microsoft Windows™ applications that run across many different environments. In the alternative embodiment employing the IBM Tivoli™ Web Response Monitor component previously mention, real IP traffic from a real to a web server is monitored and recorded as real user transactions against a web application. For example, each URL to a web application is a transaction in this case. Also, if the URL has forms to submit via GET or POST commands, then the client-provided information is also recorded, and the ITCAM administrator would define what the robotic agent should provide as the input in place of the real customer data. For example, if the real client provided his login ID and password, the robot script is configured not to log in as a real user (with a real user ID and password), because the next set of collected transaction data would include that regarding real user transactions and information about the robotic transactions. Other such modifications may be needed against the automatically generated script, as certain cases arise.

If the service delivered to end users degrades, ITCAM recognizes this and alerts a system administrator to the problem.

ITCAM for RTT measures the end-user experience by monitoring the round trip response time of transactions originating at the client desktop, and it integrates with the IBM Tivoli Data Warehouse so collected data can be stored for historical analysis and long-term planning.

ITCAM for RTT runs in both a single-server environment and in a clustered environment, and monitors what area of the Web or what transactions an administrator wants to investigate, the type of information to be collected, the thresholds that tell the software when and how to contact an administrator if performance degrades, and when the administrator wants the monitoring to occur.

For the purposes of the present disclosure, a "transaction" will refer to an exchange of data and commands that accomplishes a particular action or result. A transaction can occur between a workstation and a program, two workstations, or two programs. ITCAM for RTT recognizes a transaction at the point when it first comes in contact with monitoring instrumentation. This point of contact is called the "edge". The comprehensive transaction decomposition environment shows the "path" of problem transactions, isolates the source of problems, and launches the IBM Tivoli Monitoring Web Health Console or IBM Tivoli Composite Application Management for WebSphere™ to identify the problem so an administrator can restore good response time. A "subtransaction" will refer to an individual step (such as a single page request) in the overall transaction.

ITCAM for RTT uses "monitors" to collect information and to forward collected information. Monitors are typically software programs loaded on a client system, on a server system, or on multiple clients and servers. There are a variety of monitors available in the ITCAM for RTT product, which allow an administrator to (a) recognize problems before they occur by accessing the health of business components with robotic monitors, and (b) pinpoint problems as they occur with listening monitors that monitor every step of real customer transactions.

"Robotic monitors" run typical customer transactions from a robotic workstation and collect performance data. The performance data helps determine whether a transaction is performing as expected and exposes problem areas of the Web and application environment.

"Listening monitors" help pinpoint problems as they occur by monitoring every step of real customer transactions. Listening monitors collect performance data and produce detailed information about transaction performance times to measure the performance of subtransactions.

The monitoring software writes the collected "performance data" to disk. An administrator can specify whether to save aggregate data (to conserve system resources and to view fewer data points) or both aggregate and instance data. The software also correlates the collected data. Performance data can be categorized as follows:

(a) Hourly Average data (also called Aggregate data), which averages all response times detected over a one-hour period to provide a view of the overall performance of a transaction;

(b) Instance data, which consists of response times that are collected every time the transaction runs;

(c) Instance on Failure data, which is automatically collected if a transaction exceeds specified thresholds; and (d) Correlation data, which tracks hierarchical relationships among transactions and associates transactions with nested subtransactions.

Figure 5:
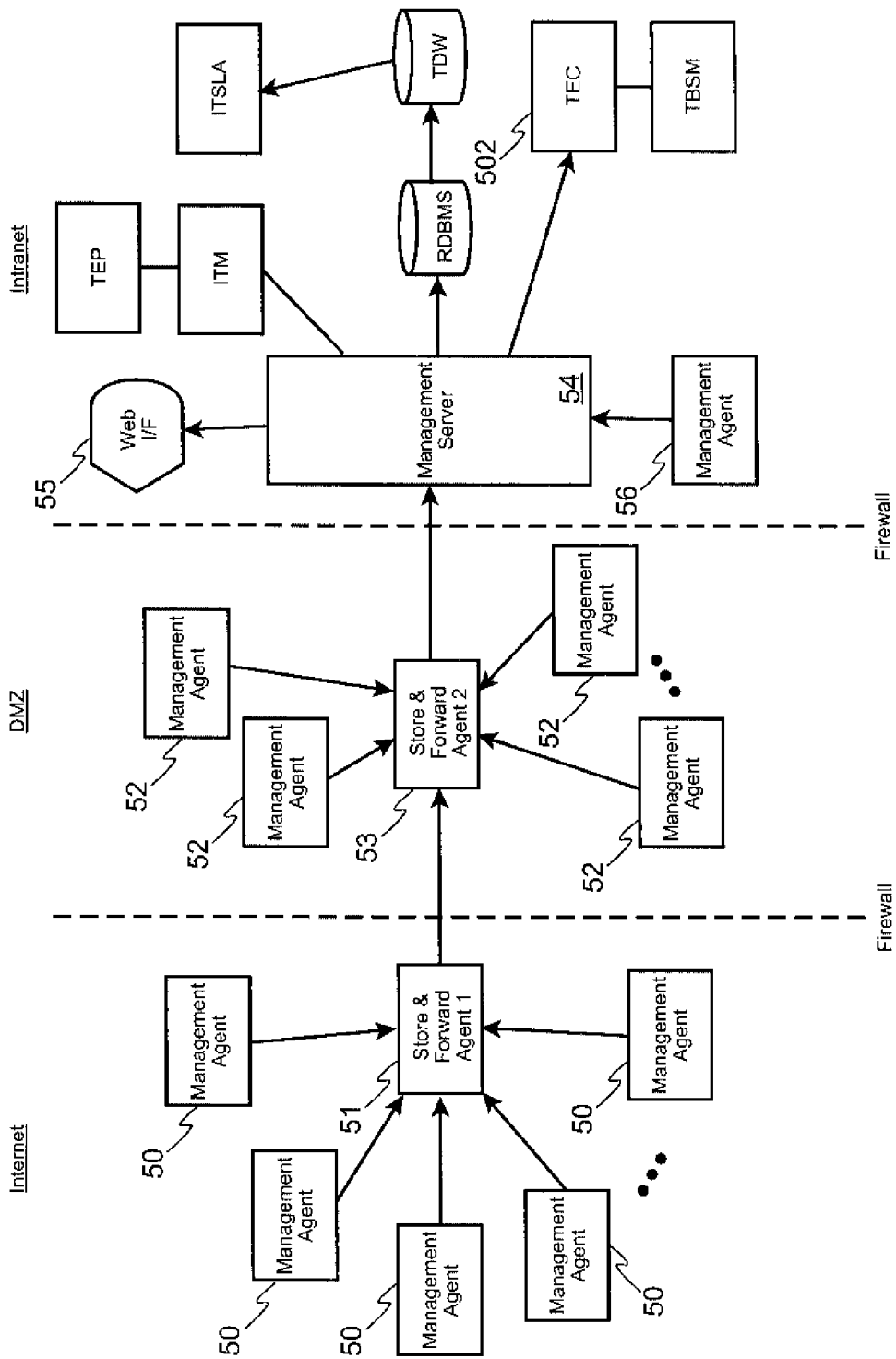
FIG. 5 illustrates in a general sense a single server environment for transaction processing.

ITCAM for RTT can be deployed to a single-server environment as well as to clustered server environments. Turning to FIG. 5, a general arrangement of components, networks, and users of client computers ("client, clients") to perform transactions with server systems ("server, servers") in a "single server" environment is shown. A typical infrastructure includes a Web tier with several Web servers hosting the static content for an application and an application tier hosting the dynamic content. The Web tier typically uses a load balancer to distribute application requests among Web servers. Each Web server can use a plug-in to direct requests for dynamic content from the Web server to the back-end application server. The application server provides many services to the application running on it, including data persistence, access to back-end databases, access to messaging infrastructures, security, and access to legacy systems.

Management agents (50, 52, 56) run on computers across the environment, and identify transactions that might need monitoring, collect performance data by running regularly scheduled listening and robotic monitors, and send generated events to the management server. Each listening and playback component is instrumented to retrieve data using application response monitoring ("ARM") standards, such as the Open Group's Application Response Measurement (ARM) Application Programming Interface ("API"), dated July 1998, which is incorporated by reference herein.

Store and forward agents (51, 53) are located in the Internet, in a "DMZ", or in both the Internet and a DMZ. A DMZ is computer or subnetwork between a private Intranet and the public Internet. The store and forward agents (51, 53) provide bidirectional support for a secure connection from the management agents to the management server through a firewall (a) by enabling point-to-point connections between management agents and the management server (54); (b) by enabling management agents to interact with Store and Forward as if Store and Forward were a management server; (c) by routing requests and responses to the correct target; (d) by supporting secure socket layer ("SSL") communications; and (e) by supporting one-way communications through the firewall.

The Management Server (54) is typically located in an Intranet, and it provides centralized management, employing web services to communicate with management agents at regularly scheduled intervals, called the upload interval, such as once an hour. A typical management server includes the following pieces (a) a user interface (55) which provides a way to interact with the monitoring software (e.g. an administrator can access the user interface through a Web browser); (b) a real-time report display to view collected performance data; and (c) an event system which notifies administrators in real time about the status of monitored transactions through reports, e-mail notification, or events sent to the IBM Tivoli Enterprise Console (502) or the simple network management protocol (SNMP). The Management Server also provides access to other system components, such as a relational database management system ("RDBMS"), and Tivoli Data Warehouse ("TDW"), and other well known Tivoli products and systems (TEP, ITM, ITSLA, TBSM), as well as non-Tivoli and non-IBM components.

Figure 6:
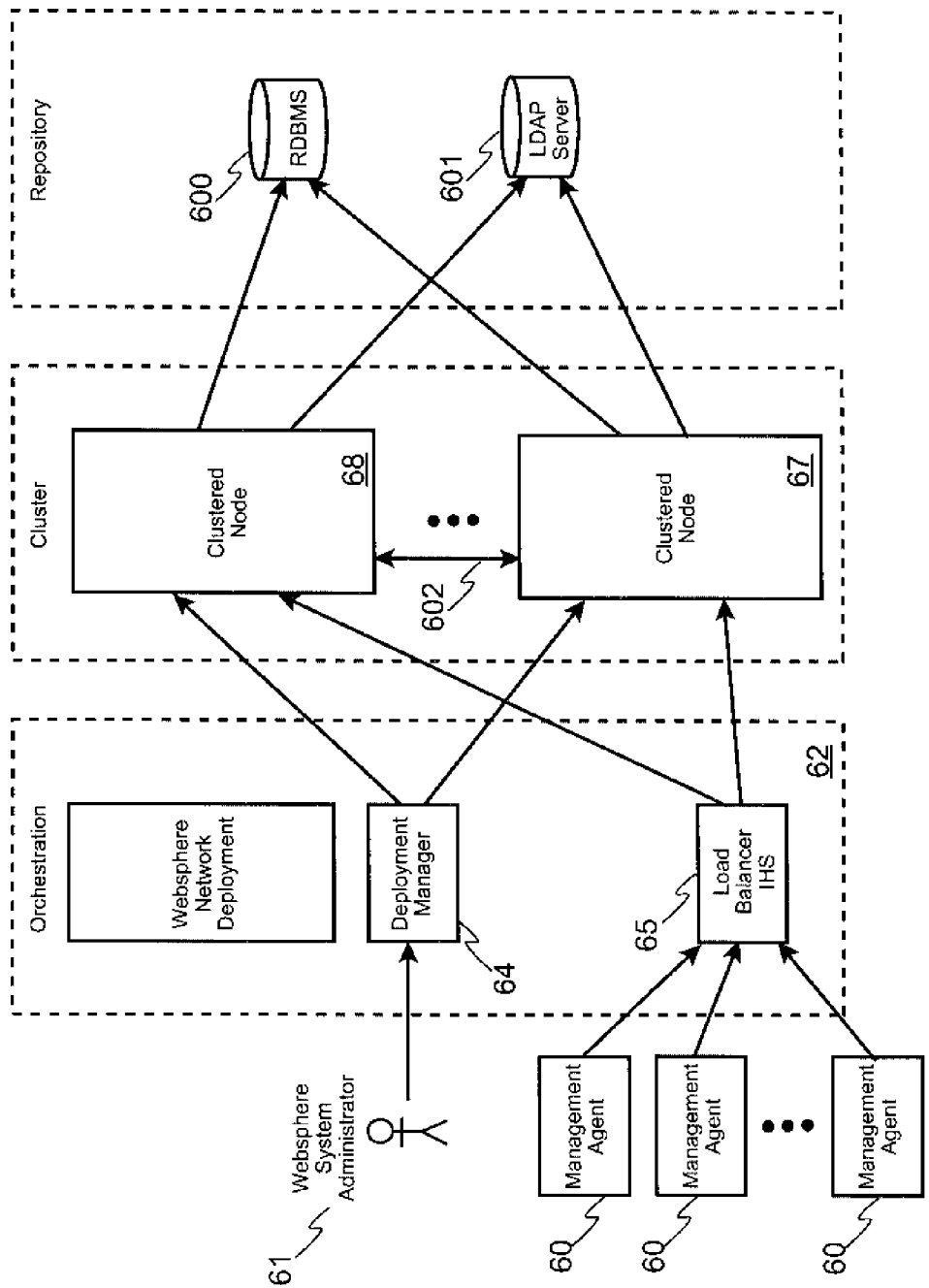
FIG. 6 illustrates in a general sense a clustered-server environment for transaction processing.

ITCAM for RTT also supports a high number of management agents connected to a single management server deployed to a server cluster, such as a WebSphere cluster, to provide high availability, fault tolerance, and increased scalability. Workload management and distributing requests through load balancers provides scalability in the cluster environment. Each server component can service any request from any management agent in any order. ITCAM for RTT supports "horizontal clustering", which contains multiple physical machines (nodes), as well as "vertical clustering", which contains multiple application server instances hosted on the same physical machine (node). Turning to FIG. 6, a representation of a clustered environment is shown having a plurality of management agents (60), and an administrator (61). The Deployment Manager (64), which is part of an "orchestration" layer (62), provides node configuration and management, as well as workload distribution. A Load Balancer (65), also part of orchestration (62), provides load balancing for multiple Application Server nodes (67, 68) by distributing requests to the various nodes. One or more Database Systems (600) act as data repositories, and provide session failover support. And, one or more Lightweight Directory Access Protocol ("LDAP") systems (601) may be required for purposes such as providing a user registry for security in a horizontal cluster.

Figure 7:
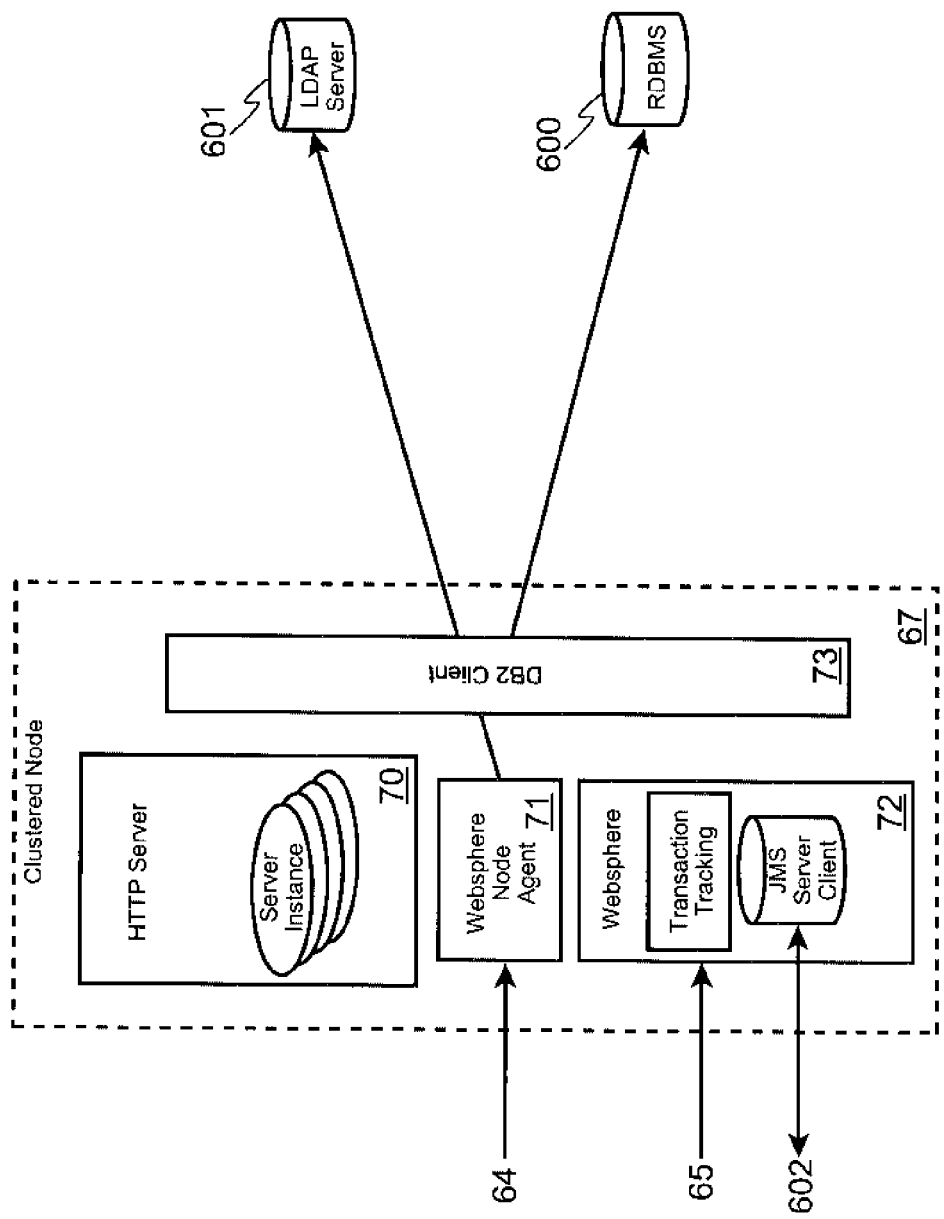
FIG. 7 provides more details of a cluster node referred to in FIG. 6.

An application server node (67, 68), such as IBM WebSphere Application Server servers. FIG. 7 provides more details of a clustered node (67) example. A node (67) hosts one or more server instances, and an IBM WebSphere Application Server node agent enables communication with the Deployment Manager (64). A Hyper Text Transfer Protocol ("HTTP") server, such as an IBM HTTP server (70), provides load balancing (65) for server instances. A Java Messaging Service ("JMS") agent allows communication (72) between nodes, a database client (73) allows communication to one or more database management systems (600).

ARM and Correlation. In one embodiment of the invention, an Application Response Measurement (ARM) API is employed for capturing transaction performance data. The ARM standard describes a common method for integrating enterprise applications as manageable entities and extends enterprise management tools directly to ARM-instrumented applications.

ARM provides a way for business applications to pass information about the subtransactions initiated in response to service requests that flow across a network. The ARM API also defines a set of functions for instrumenting an application so the start and stop of important transactions can be identified. This information is used to calculate response times, identify subtransactions, and provide additional data for determining the cause of performance problems. The ARM engine is a multithreaded application, and it exchanges data though an IPC channel with ARM instrumented applications. ARM aggregates collected data to generate useful information and correlates it with other transactions; users specify how thresholds are measured.

ARM Correlation maps parent transactions to their respective child transactions across multiple processes and multiple servers. Each monitoring component is ARM-instrumented and generates a correlator. The initial root/parent (or edge) transaction is the only transaction that does not have a parent correlator. The response tracker automatically connects parent correlators with child correlators to trace the path of a distributed transaction through the infrastructure and visualizes the path in topology views. Correlation can be broken into several types or categories:

(a) path-based aggregation, which is based upon the origin of the transaction, the first point in the infrastructure that the product detects the transaction, and the parent transaction who called the current transaction as well as the current transaction information (i.e. each subtransaction is aggregated separately whenever it is called on behalf of a different entry point);

(b) policy-based correlators, through which monitors can control what percent of the transactions are monitored, as well as how much information is collected for those monitored transactions. (i.e. enabling subtransaction collection of all methods in IBM WebSphere Application Server instead of accepting the default collection of only Servlet, EJB, JMS, and JDBC methods, etc.);

(c) instance and aggregated performance statistics, which provides additional metrics and a complete and exact trace of the path taken by a specific transaction;

(d) threshold violation initiated trace, which provides dynamic collection of instance data across all systems where a transaction executes; and (e) sibling transaction ordering, which provides the ability to determine the execution order of a set of child transactions relative to each other.

The monitoring processes treat periodic average correlation in the following three ways:

(a) edge aggregation by pattern, which averages all transactions that match an edge monitor pattern;

(b) edge aggregation by transaction name, which uniquely averages each transaction name that matches a monitor's edge pattern, also called "discovery," because it discovers all the edges that match the specified edge pattern; and (c) aggregation by root/parent/transaction directs each transaction instance to a specific aggregator based upon correlation using the following properties: Origin Host UUID, Root Transaction ID, Parent Transaction ID, and Transaction ID.

As previously mentioned, small amounts of data referred to as ARM "correlators" are passed along with the transaction requests and responses in order to enable end-to-end transaction identification and tracking. There are a variety of mechanisms for passing ARM correlators from one application to another or inside the application, including passing the correlator in an HTTP header, in a JMS header, RMI-IIOP context, and SOAP headers. Transactions entering the J2EE Application Server might already have an associated correlator if the transaction is monitored by Quality of Service, STI, J2EE instrumentation on another J2EE application server or Rational Robot (Generic Windows), otherwise the correlator contains information that tells this engine and downstream engines to not monitor anything about this transaction.

Logical Processes of the Invention

Robotic transaction generation and playback according to the present invention allows a transactional client-server system to realistically, albeit automatically, simulate end user experiences, such as interactions with an online bookstore, online banking, travel reservation, etc.

Traditionally, it has been difficult to manually generate simulated transactions for robotic playback because (1) it's difficult to know what software processes should be monitored, (2) it is time consuming to record simulated transactions and keep them updated over time to make sure they are simulating current user requests even after the software system is updated, and (3) it's difficult to know the geographic location at which to place robotic monitors to playback the transactions, to get an accurate view of world-wide end user experience.

Having recognized this problem, the inventors of the present invention have developed a system and process which analyzes previously collected transaction monitoring data, such as log files generated by an HTTP server, web and application server configuration files and monitoring data from transaction tracking tools, and to determine the transactions that are being accessed most by end users, as illustrated in FIG. 1a by:

(a) determining (100) which transactions are important to monitor based on frequency of usage, business value of the transaction, meeting of Service Level Agreement ("SLA") requirements, transactions involving Universal Resource Locators ("URL") which are designated as important, or other criteria, by accessing and analyzing server transaction logs (101) and optionally ARM logs and statistics (102);

(b) automatically configuring (103), if necessary, one or more monitoring agents (104), which monitor the targeted servers and applications (109), to collect actual transaction details of the determined most important transaction types, optionally during specific transaction periods;

(c) based upon collected transaction logs (101), and optionally upon ARM agent information (102), WRM data or transaction data from another source, automatically generating (105) one or more simulated transaction scripts that, when "played back" by a client robot, will exercise the most important requests to be monitored, preferably using simulated user accounts and passwords if applicable; and (d) deploying (106) transaction playback robots (107) and the generated transaction scripts to playback (108) the simulated transactions at the appropriate geographic locations with the appropriate schedules so that real end user experience can be accurately assessed of the monitored servers and applications (109).

Figure 1B:
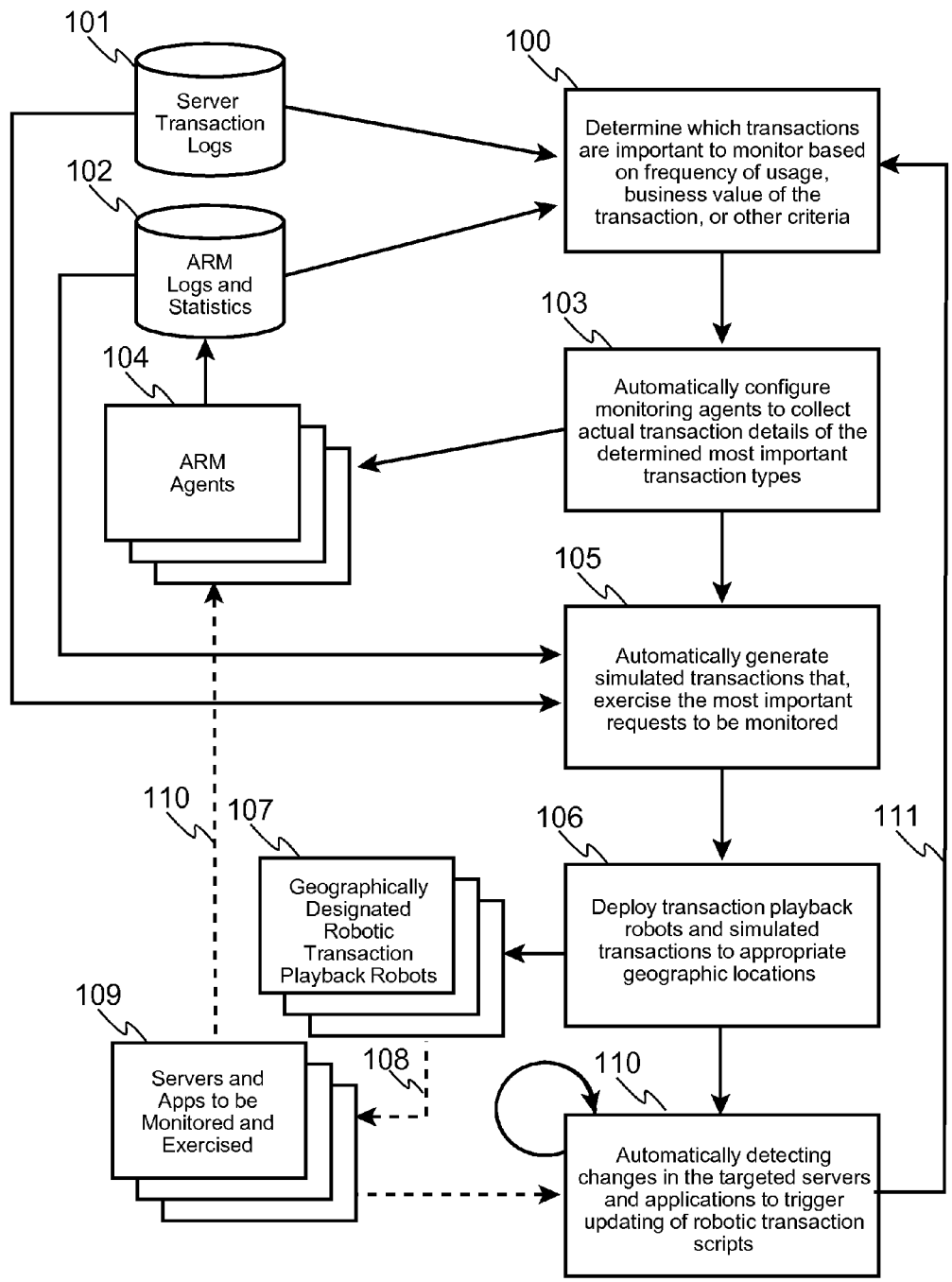

In an advanced embodiment of the invention, the process as shown in FIG. 1a is supplemented, as shown in FIG. 1b, by the addition of a automatically detecting (110) changes in the targeted servers and applications (109), and responsive (111) to a change, automatically updating the robotic simulated transactions to prevent interruption of monitoring and, optionally, updating the monitoring agent configurations (100-105).

For example, consider a typical Apache HTTP Web Server that is to be monitored, such as an online bookstore. Such a server generates several logs containing transaction information such as the Universal Resource Locators ("URLs") of the web pages requested over a period of time, the time of each request, the Internet Protocol ("IP") address of the requesting client, and any errors encountered while servicing then requests, as shown in Table 1.

TABLE 1

Example HTTP Server Log for an Online Bookstore

<URL requested><sourceIP><date><time><error>;

. . .

</childrens_features>,<239.00.134.279>,<04152007>,<16:22:03>,<OK>;
</self_improvement>,<456.687.934.111>,<04152007>,<16:23:19>, <OK>;
</discounts_clearances>,<987.456.333.321>,<04152007>,<16:23:24>, <404>;
</travel/international/spain>,<123.456.789.555>,<04152007>,<16:22:03>, <OK >;

. . .

In this example, a first "hit" or page request to the children's features page of the bookstore website was made on Apr. 15, 2007, at 3:33:03 p.m., from a clients IP address of 239.00.134.279, and the result was that the page was served successfully.

The third entry, though, shows a request for a "discounts and clearances" page, which was not successfully delivered to the client at IP address 987.456.333.321 because a 404 error (page not found) occurred. This would indicate a server-side error (e.g. a dead end link to this page), which needs to be addressed.

Finally, the last entry in this example shows a deeper link into the web site as an access to a page about travel to Spain.

This information is shown in chronological order, but may in practice be received or accessed in any order, sorted by any field (e.g. sorted by IP address, by time, by requested URL, by result, etc.).

There are well-known methods for determining the approximate geography of the requesting client because of the methodology employed in assigning and sub-netting IP addresses. Other known methods, such as tracking a user session when the user's location is known, or retrieving a cookie from the client device, can be employed to determine geographic region, area or location, as well. In one embodiment, such a method is employed to determine the geography of each requesting client, and optionally, to annotate the log information as follows in Table 2.

TABLE 2

Example Annotated HTTP Server Log for an Online Bookstore

<URL requested><sourceIP+location><date><time><error>;
. . .
</childrens_features>,<Houston-TX>,<04152007>,<16:22:03>,<OK>;
</self_improvement>,<Atlanta-GA>,<04152007>,<16:23:19>,<OK>;
</discounts_clearances>,<Idaho><04152007>,<16:23:24>,<404>;
</travel/international/spain>,<Chicago-IL>,<04152007>,<16:22:03>,<OK>;
. . .

According to the present invention, this data is analyzed to determine information such as the most commonly used parts of the web application (e.g. URLs with the most requests), time periods of use, and the most commonly used parts of the application by client geography as known by the IP address or some other means (e.g. cookie, client registration, username, etc.).

For example, consider an expanded example of Table 3.

TABLE 3

Example Annotated HTTP Server Log for an Online Bookstore

<URL requested><sourceIP+location><date><time><error>;
. . .
</en/childrens_features>,<Houston-TX>,<04152007>,<16:22:03>,<OK>;
</en/self_improvement>,<Atlanta-GA>,<04152007>,<16:23:19>,<OK>;
</en/discounts_clearances>,<Idaho>,<04152007>,<16:23:24>,<404>;
</en/ travel/international/spain>,<Chicago-IL>,<04152007>, <16:22:03>, <OK>;
. . .
</jp/childrens_features>,<Tokyo-JP>,<04152007>,<20:12:03>,<OK>;
</ jp/self_improvement>,< Yokohama-JP>,<04152007>,<20:13:19>, <OK>;
</ jp/discounts_clearances>,< Osaka-JP>,<04152007>,<20:13:27>, <404>;
</ jp/travel/international/spain>,< Kyoto-JP>,<04152007>,<20:14:03>, <404>;
. . .

In this example, it is evident due to the arrangement and sorting of the records that a set of English pages (denoted by the "/en" in the URL) is accessed during a system time period around 3:20 p.m., and that a set of Japanese pages (denoted by the "/jp" in the URL) is accessed during a system time period around 10:12 p.m. This is likely due to the different time zones of the source geographies. Also, it can be seen from this set of examples that the Japanese access attempt to the Spanish travel page was unsuccessful, but the equivalent English access was successful earlier in the day, perhaps due to network difficulty or even due to late night, early morning server maintenance inavailability.

Additionally, the present invention detects when a URL or portion of an application is updated or changed, which may also be detectable from such logs, as illustrated in Table 4 for a change to the self improvement books page.

TABLE 4

Example Annotated HTTP Server Log for an Online Bookstore

<URL requested><URL-rev-date><sourceIP+location><date><time><error>;
. . .
</en/childrens_features>,<01012007>,<HoustonTX>,<04152007>, <16:22:03>,<OK>;
</en/self_improvement>,<01012007>,<AtlantaGA>,<04152007>, <16:23:19>,<OK>;
</en/discounts_clearances>,<01012007><Idaho>,<04152007>, <16:23:24>,<404>;
</en/ travel/international/spain>,<01012007><Chicago-IL>,<04152007>, <16:22:03>,<OK>;
. . .
</en/childrens_features>,<01012007>,<HoustonTX><04162007>, <10:19:03>,<OK>;
</en/self_improvement>,<04152007><AtlantaGA>,<04162007>, <10:19:19>,<OK>;
</en/discounts_clearances>,<01012007><Idaho>,<04162007>, <10:19:24>,<404>;
</en/ travel/international/spain>,<01012007><Chicago-IL>,<04162007>, <10:20:03>,<OK>;
. . .

According to user selections, the invention then identifies:
(a) which URLs are accessed the greatest number of times;
(b) which URLs are accessed most often;
(c) what time periods each URL is accessed most often;
(d) which geographies access each URL the greatest number of times;
(e) which geographies access each URL the most often; and
(f) optionally, which URLs have recently changed or been updated.

Next, in order to capture detailed information needed to simulate an actual transaction, the invention automatically determines any updates needed to existing monitoring agents. In the example of Table 3, monitoring agents in Japan may be configured to collect transaction details during the 10:00 p.m. to 11:00 p.m. period (system time), and monitoring agents in the USA may be configured to capture transaction details during the period of 10:00 a.m. to 4:00 p.m. (system time). These changes are propagated through the normal means of remotely updating the monitoring agents, such as through the control means of ITCAM for RTT.

After the collection period has completed, the invention then receives the logged monitor information, and compares the transactions to each other to determine differences between them, such as usernames, passwords, specific list choices, etc. (e.g. user-supplied and user-unique information) These points of differences are then used to remove "real" information from each transaction, and the real information is replaced with test information (e.g. fake usernames, fake passwords, fake list choices which are registered with the server and are valid with respect to the application logical flow). Preferably, an administrator is prompted to show the points of insertion of fake or test-case information, and the administrator is allowed to input or select the replacement information to be utilized in the script. Alternatively, in some embodiments, certain information may be replaced with standardized or pre-determined information. In either case, this results in a transaction sequence which is realistically based on actual steps taken by actual users, but which incorporates non-real user information.

It is important to note that due to the automation of the invention, different transaction scripts for different topologies are easily and readily created. For example, if a bookstore's self-help area is most popular from Washington state in the USA, transaction scripts are automatically generated and associated with that geography. But, this area of the online bookstore may be relatively unpopular (and unaccessed) by users in Italy, who frequent the bookstore's art history area much more often. As such, scripts to exercise the self-help area and to exercise the art history area would be created.

But, in the next phase of the invention, the scripts are not necessarily uniformly distributed to all robotic agents running on remote clients devices, and they are not necessarily configured to run a uniform times. Instead, the self-help area script would be distributed to the robotic agents running on clients in the Washington state area, while the art history script would be distributed to the robotic agents running on the clients in Italy. And, the self-help scripts would be configured to execute during the periods detected to be the most common times of usage from users in Washington, and likewise, the art history scripts would be configured to be executed during times most often accessed by Italian users. For the purposes of executing tests which closely simulate real transactions, geographic locales and regions are defined in such a manner so as to include at least one available robotic agent. Further, some robotic agents may be defined to fall within two or more regions or locales (e.g. the regions overlap), depending on equipment availability, network topology, security issues, and costs of hardware.

In a variation of the present invention, rather than synchronize the execution of the transaction scripts with the detected, actual periods of greatest use of the target URLs and application portions, the scripts can also be programmed to execute during lower or least usage periods. This type of out-of-phase execution is useful for load testing an application at times which are less critical to serving the actual business objectives of the system. Alternatively, the scripts can be programmed to execute at times evenly throughout a day or week, thus creating a background testing scenario.

In another variation of the present invention, when a change to a targeted URL is detected, such as a revision of a page or a portion of an application, the scripts which exercise that URL are automatically disabled to prevent aberrant creation of errors and potentially triggering unnecessary maintenance corrective actions. Instead, the process of reconfiguring monitoring agents is performed, if necessary, and new transaction data is collected. Then, the analysis of the new transaction data is performed to yield new scripts which target the modified or updated URLs. These new scripts are then distributed accordingly (e.g. to relevant geographies), and enabled to resume testing as previously described (e.g. at times of greatest usage, or as background, or as out-of-phase). The schedules, locations and scripts that are automatically generated for playback are preferably automatic defaults, and preferably an administrator is allowed to customize those scripts to override any of the defaults. In some embodiments, the administrator is allowed to permanently override a default rule or parameter of a script. For embodiments which encode each assumption is a rule, as defined in any rule based system, then the administrator just need to replace the rule with one that matches their particular needs. Each rule then just acts as a template or default behavior that can be customized.

Click-Path and Session Tracking Implementation Details

In one available embodiment, the most frequent user click paths (sessions) are monitored and tracked using a unique tracking token such as a Session ID. This allows the invention to group sets of user requests into a common ordered list of requests that represent a single business transaction which is realized as a single robotic simulated transaction recording. For example, tracking and be performed using JSESSIONIDs in Websphere™, or by using the ARM Correlator defined in ITCAM for RTT.

In an alternative embodiment, well-known "cookies" may be utilized to create a unique id that is persistent on the client's system, thereby allowing session and user tracking for the purpose of identifying collected transaction information. Other available techniques for session tracking may be employed in other embodiments of the invention.

Packaging and Distribution Variations

The automatically generated simulated transaction scripts may be created within each environment to be exercised, and alternatively may be transferred from one environment to another, with any appropriate adjustments as needed for the new target environment. This allows the development of a library or range of "out of the box" useable transaction scripts, which will then automatically be updated upon changes to the server or applications so that they evolve into customized transaction exercises for the targeted applications and servers as the applications and servers are updated.

Service-Based Embodiments

Alternative embodiments of the present invention include some or all of the foregoing logical processes and functions of the invention being provided by configuring software, deploying software, downloading software, distributing software, or remotely serving clients in an on demand environment.

Software Deployment Embodiment. According to one embodiment of the invention, the methods and processes of the invention are distributed or deployed as a service by a service provider to a client's computing system(s).

Figure 3A:
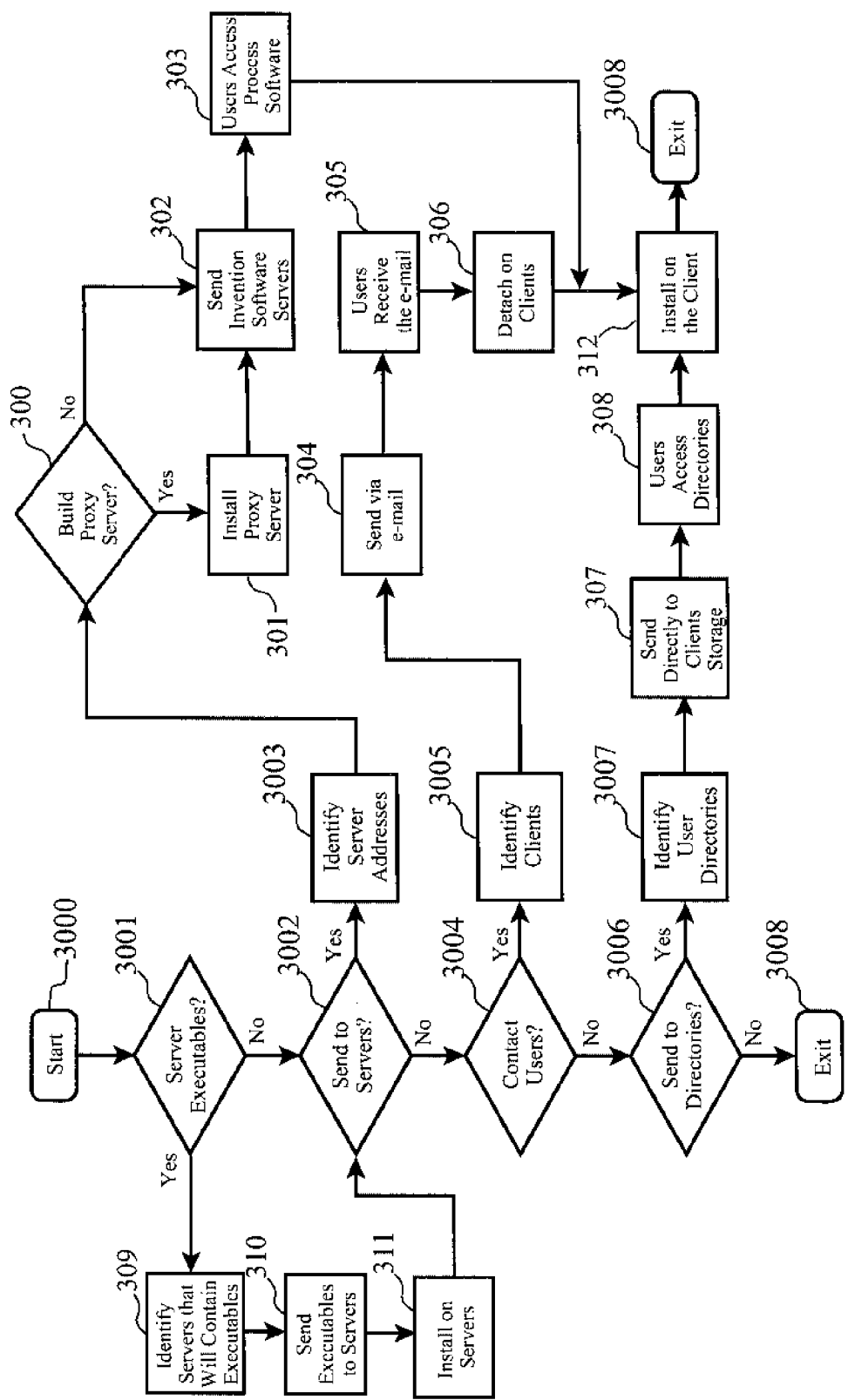
FIG. 3a sets forth a logical process to deploy software to a client in which the deployed software embodies the methods and processes of the present and related inventions.

Turning to FIG. 3a, the deployment process begins (3000) by determining (3001) if there are any programs that will reside on a server or servers when the process software is executed. If this is the case, then the servers that will contain the executables are identified (309). The process software for the server or servers is transferred directly to the servers storage via FTP or some other protocol or by copying through the use of a shared files system (310). The process software is then installed on the servers (311).

Next a determination is made on whether the process software is to be deployed by having users access the process software on a server or servers (3002). If the users are to access the process software on servers, then the server addresses that will store the process software are identified (3003).

In step (3004) a determination is made whether the process software is to be developed by sending the process software to users via e-mail. The set of users where the process software will be deployed are identified together with the addresses of the user client computers (3005). The process software is sent via e-mail to each of the user's client computers. The users then receive the e-mail (305) and then detach the process software from the e-mail to a directory on their client computers (306). The user executes the program that installs the process software on his client computer (312) then exits the process (3008).

A determination is made if a proxy server is to be built (300) to store the process software. A proxy server is a server that sits between a client application, such as a Web browser, and a real server. It intercepts all requests to the real server to see if it can fulfill the requests itself. If not, it forwards the request to the real server. The two primary benefits of a proxy server are to improve performance and to filter requests. If a proxy server is required then the proxy server is installed (301). The process software is sent to the servers either via a protocol such as FTP or it is copied directly from the source files to the server files via file sharing (302). Another embodiment would be to send a transaction to the servers that contained the process software and have the server process the transaction, then receive and copy the process software to the server's file system. Once the process software is stored at the servers, the users via their client computers, then access the process software on the servers and copy to their client computers file systems (303). Another embodiment is to have the servers automatically copy the process software to each client and then run the installation program for the process software at each client computer. The user executes the program that installs the process software on his client computer (312) then exits the process (3008).

Lastly, a determination is made on whether the process software will be sent directly to user directories on their client computers (3006). If so, the user directories are identified (3007). The process software is transferred directly to the user's client computer directory (307). This can be done in several ways such as, but not limited to, sharing of the file system directories and then copying from the sender's file system to the recipient user's file system or alternatively using a transfer protocol such as File Transfer Protocol ("FTP"). The users access the directories on their client file systems in preparation for installing the process software (308). The user executes the program that installs the process software on his client computer (312) then exits the process (3008).

Software Integration Embodiment. According to another embodiment of the present invention, software embodying the methods and processes disclosed herein are integrated as a service by a service provider to other software applications, applets, or computing systems.

Integration of the invention generally includes providing for the process software to coexist with applications, operating systems and network operating systems software and then installing the process software on the clients and servers in the environment where the process software will function.

Generally speaking, the first task is to identify any software on the clients and servers including the network operating system where the process software will be deployed that are required by the process software or that work in conjunction with the process software. This includes the network operating system that is software that enhances a basic operating system by adding networking features. Next, the software applications and version numbers will be identified and compared to the list of software applications and version numbers that have been tested to work with the process software. Those software applications that are missing or that do not match the correct version will be upgraded with the correct version numbers. Program instructions that pass parameters from the process software to the software applications will be checked to ensure the parameter lists matches the parameter lists required by the process software. Conversely parameters passed by the software applications to the process software will be checked to ensure the parameters match the parameters required by the process software. The client and server operating systems including the network operating systems will be identified and compared to the list of operating systems, version numbers and network software that have been tested to work with the process software. Those operating systems, version numbers and network software that do not match the list of tested operating systems and version numbers will be upgraded on the clients and servers to the required level.

After ensuring that the software, where the process software is to be deployed, is at the correct version level that has been tested to work with the process software, the integration is completed by installing the process software on the clients and servers.

Figure 3B:
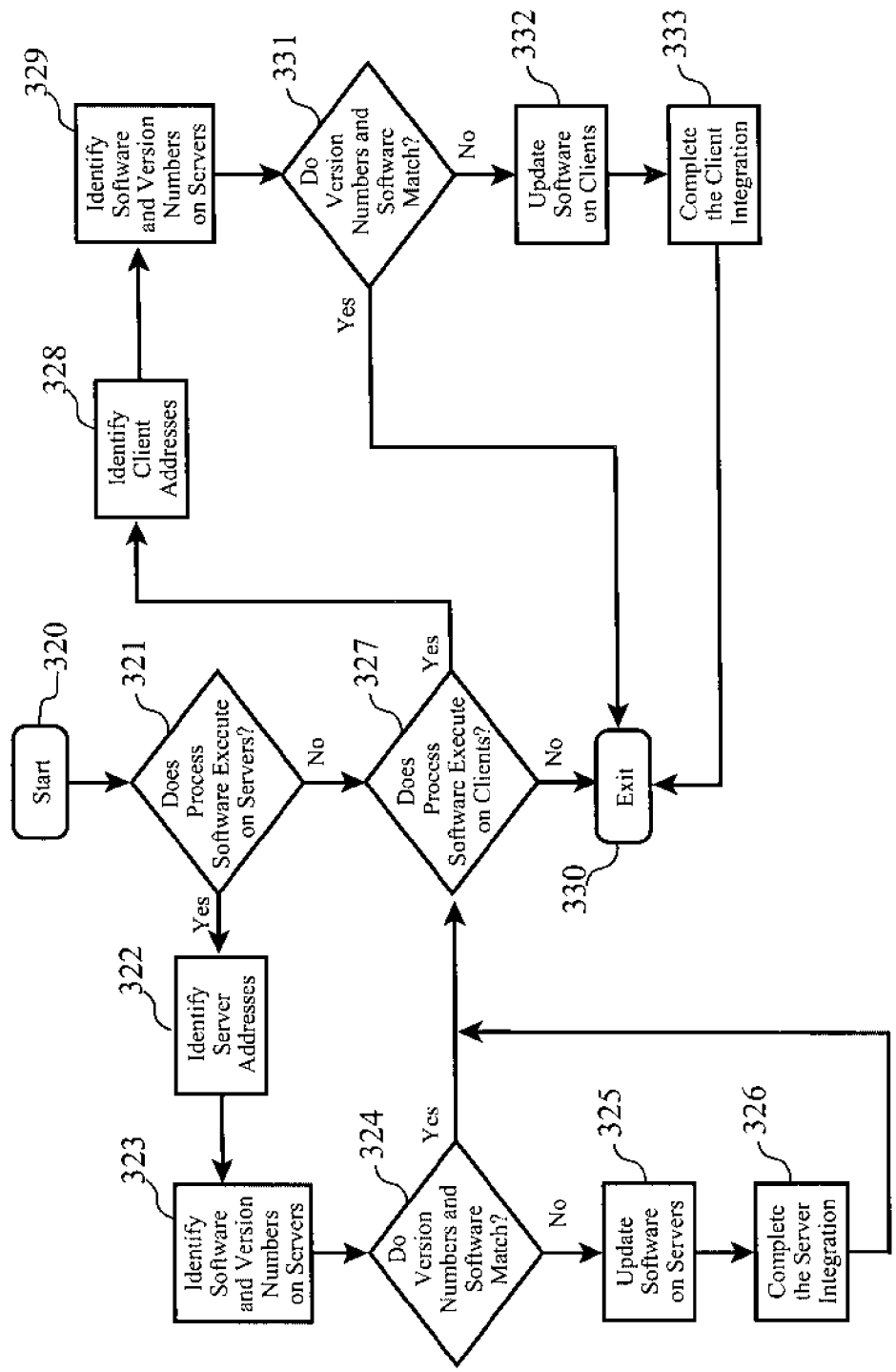
FIG. 3b sets forth a logical process to integrate software to other software programs in which the integrated software embodies the methods and processes of the present and related inventions.

Turning to FIG. 3b, details of the integration process according to the invention are shown. Integrating begins (320) by determining if there are any process software programs that will execute on a server or servers (321). If this is not the case, then integration proceeds to (327). If this is the case, then the server addresses are identified (322). The servers are checked to see if they contain software that includes the operating system ("OS"), applications, and network operating systems ("NOS"), together with their version numbers, that have been tested with the process software (323). The servers are also checked to determine if there is any missing software that is required by the process software (323).

A determination is made if the version numbers match the version numbers of OS, applications and NOS that have been tested with the process software (324). If all of the versions match, then processing continues (327). Otherwise, if one or more of the version numbers do not match, then the unmatched versions are updated on the server or servers with the correct versions (325). Additionally, if there is missing required software, then it is updated on the server or servers (325). The server integration is completed by installing the process software (326).

Step (327) which follows either (321), (324), or (326) determines if there are any programs of the process software that will execute on the clients. If no process software programs execute on the clients, the integration proceeds to (330) and exits. If this is not the case, then the client addresses are identified (328).

The clients are checked to see if they contain software that includes the operating system ("OS"), applications, and network operating systems ("NOS"), together with their version numbers, that have been tested with the process software (329). The clients are also checked to determine if there is any missing software that is required by the process software (329).

A determination is made if the version numbers match the version numbers of OS, applications and NOS that have been tested with the process software 331. If all of the versions match and there is no missing required software, then the integration proceeds to (330) and exits.

If one or more of the version numbers do not match, then the unmatched versions are updated on the clients with the correct versions (332). In addition, if there is missing required software then it is updated on the clients (332). The client integration is completed by installing the process software on the clients (333). The integration proceeds to (330) and exits.

Application Programming Interface Embodiment. In another embodiment, the invention may be realized as a service or functionality available to other systems and devices via an Application Programming Interface ("API"). One such embodiment is to provide the service to a client system from a server system as a web service.

On-Demand Computing Services Embodiment. According to another aspect of the present invention, the processes and methods disclosed herein are provided through an on demand computing architecture to render service to a client by a service provider.

Figure 3C:
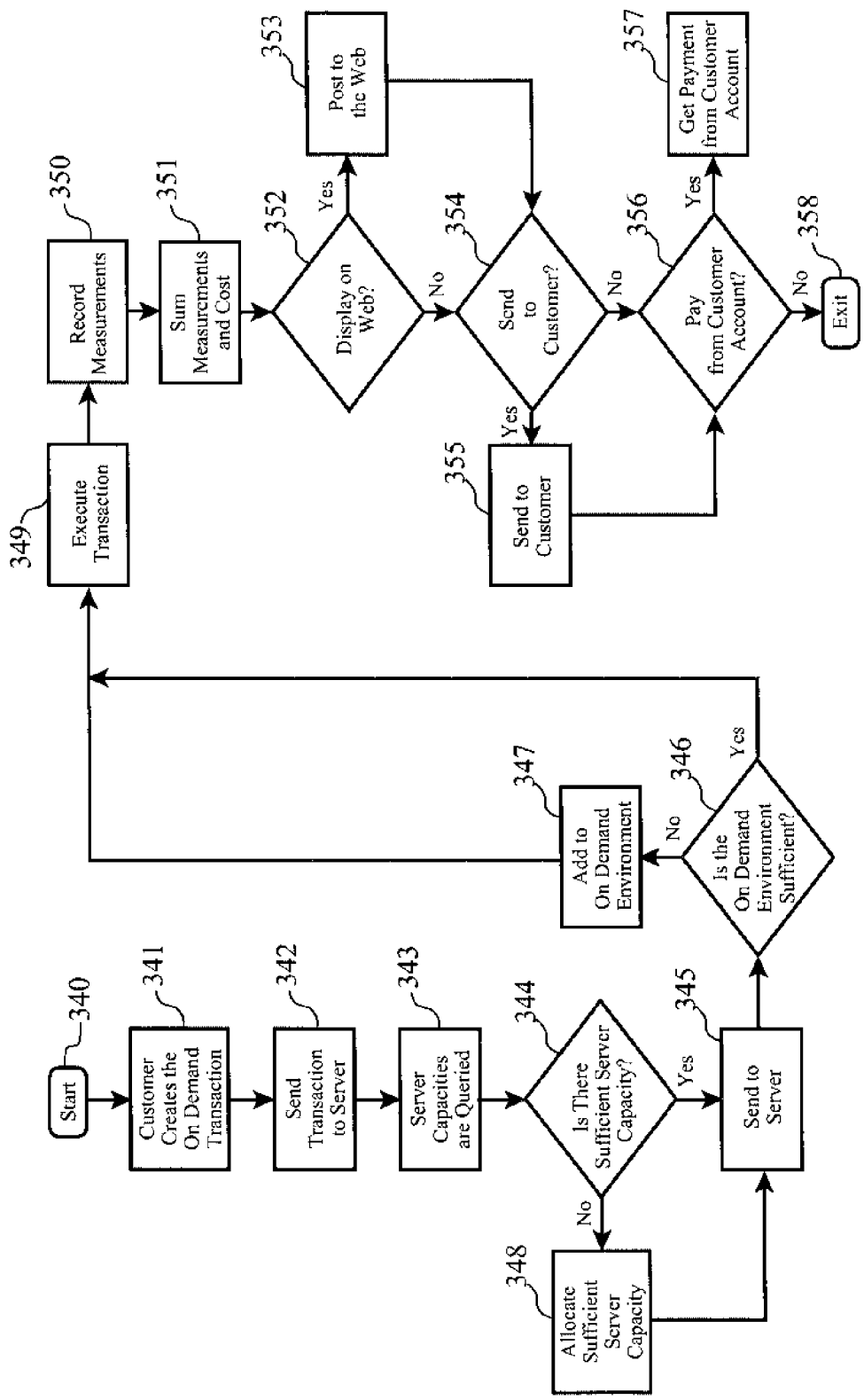
FIG. 3c sets forth a logical process to execute software on behalf of a client in an on-demand computing system, in which the executed software embodies the methods and processes of the present and related inventions.

Turning to FIG. 3c, generally speaking, the process software embodying the methods disclosed herein is shared, simultaneously serving multiple customers in a flexible, automated fashion. It is standardized, requiring little customization and it is scaleable, providing capacity on demand in a pay-as-you-go model.

The process software can be stored on a shared file system accessible from one or more servers. The process software is executed via transactions that contain data and server processing requests that use CPU units on the accessed server. CPU units are units of time such as minutes, seconds, hours on the central processor of the server. Additionally, the assessed server may make requests of other servers that require CPU units. CPU units are an example that represents but one measurement of use. Other measurements of use include but are not limited to network bandwidth, memory usage, storage usage, packet transfers, complete transactions, etc.

When multiple customers use the same process software application, their transactions are differentiated by the parameters included in the transactions that identify the unique customer and the type of service for that customer. All of the CPU units and other measurements of use that are used for the services for each customer are recorded. When the number of transactions to any one server reaches a number that begins to effect the performance of that server, other servers are accessed to increase the capacity and to share the workload. Likewise, when other measurements of use such as network bandwidth, memory usage, storage usage, etc. approach a capacity so as to effect performance, additional network bandwidth, memory usage, storage etc. are added to share the workload.

The measurements of use used for each service and customer are sent to a collecting server that sums the measurements of use for each customer for each service that was processed anywhere in the network of servers that provide the shared execution of the process software. The summed measurements of use units are periodically multiplied by unit costs and the resulting total process software application service costs are alternatively sent to the customer and or indicated on a web site accessed by the computer which then remits payment to the service provider.

In another embodiment, the service provider requests payment directly from a customer account at a banking or financial institution.

In another embodiment, if the service provider is also a customer of the customer that uses the process software application, the payment owed to the service provider is reconciled to the payment owed by the service provider to minimize the transfer of payments.

FIG. 3c sets forth a detailed logical process which makes the present invention available to a client through an On-Demand process. A transaction is created that contains the unique customer identification, the requested service type and any service parameters that further specify the type of service (341). The transaction is then sent to the main server (342). In an On-Demand environment the main server can initially be the only server, then as capacity is consumed other servers are added to the On-Demand environment.

The server central processing unit ("CPU") capacities in the On-Demand environment are queried (343). The CPU requirement of the transaction is estimated, then the servers available CPU capacity in the On-Demand environment are compared to the transaction CPU requirement to see if there is sufficient CPU available capacity in any server to process the transaction (344). If there is not sufficient server CPU available capacity, then additional server CPU capacity is allocated to process the transaction (348). If there was already sufficient available CPU capacity, then the transaction is sent to a selected server (345).

Before executing the transaction, a check is made of the remaining On-Demand environment to determine if the environment has sufficient available capacity for processing the transaction. This environment capacity consists of such things as, but not limited to, network bandwidth, processor memory, storage etc. (345). If there is not sufficient available capacity, then capacity will be added to the On-Demand environment (347). Next, the required software to process the transaction is accessed, loaded into memory, then the transaction is executed (349).

The usage measurements are recorded (350). The usage measurements consists of the portions of those functions in the On-Demand environment that are used to process the transaction. The usage of such functions as, but not limited to, network bandwidth, processor memory, storage and CPU cycles are what is recorded. The usage measurements are summed, multiplied by unit costs and then recorded as a charge to the requesting customer (351).

If the customer has requested that the On-Demand costs be posted to a web site (352), then they are posted (353). If the customer has requested that the On-Demand costs be sent via e-mail to a customer address (354), then they are sent (355). If the customer has requested that the On-Demand costs be paid directly from a customer account (356), then payment is received directly from the customer account (357). The last step is to exit the On-Demand process.

Grid or Parallel Processing Embodiment. According to another embodiment of the present invention, multiple computers are used to simultaneously process individual audio tracks, individual audio snippets, or a combination of both, to yield output with less delay. Such a parallel computing approach may be realized using multiple discrete systems (e.g. a plurality of servers, clients, or both), or may be realized as an internal multiprocessing task (e.g. a single system with parallel processing capabilities).

VPN Deployment Embodiment. According to another aspect of the present invention, the methods and processes described herein may be embodied in part or in entirety in software which can be deployed to third parties as part of a service, wherein a third party VPN service is offered as a secure deployment vehicle or wherein a VPN is build on-demand as required for a specific deployment.

A virtual private network ("VPN") is any combination of technologies that can be used to secure a connection through an otherwise unsecured or untrusted network. VPNs improve security and reduce operational costs. The VPN makes use of a public network, usually the Internet, to connect remote sites or users together. Instead of using a dedicated, real-world connection such as leased line, the VPN uses "virtual" connections routed through the Internet from the company's private network to the remote site or employee. Access to the software via a VPN can be provided as a service by specifically constructing the VPN for purposes of delivery or execution of the process software (i.e. the software resides elsewhere) wherein the lifetime of the VPN is limited to a given period of time or a given number of deployments based on an amount paid.

The process software may be deployed, accessed and executed through either a remote-access or a site-to-site VPN. When using the remote-access VPNs the process software is deployed, accessed and executed via the secure, encrypted connections between a company's private network and remote users through a third-party service provider. The enterprise service provider ("ESP") sets a network access server ("NAS") and provides the remote users with desktop client software for their computers. The telecommuters can then dial a toll-free number to attach directly via a cable or DSL modem to reach the NAS and use their VPN client software to access the corporate network and to access, download and execute the process software.

When using the site-to-site VPN, the process software is deployed, accessed and executed through the use of dedicated equipment and large-scale encryption that are used to connect a company's multiple fixed sites over a public network such as the Internet.

The process software is transported over the VPN via tunneling which is the process of placing an entire packet within another packet and sending it over the network. The protocol of the outer packet is understood by the network and both points, called tunnel interfaces, where the packet enters and exits the network.

Figure 3D:
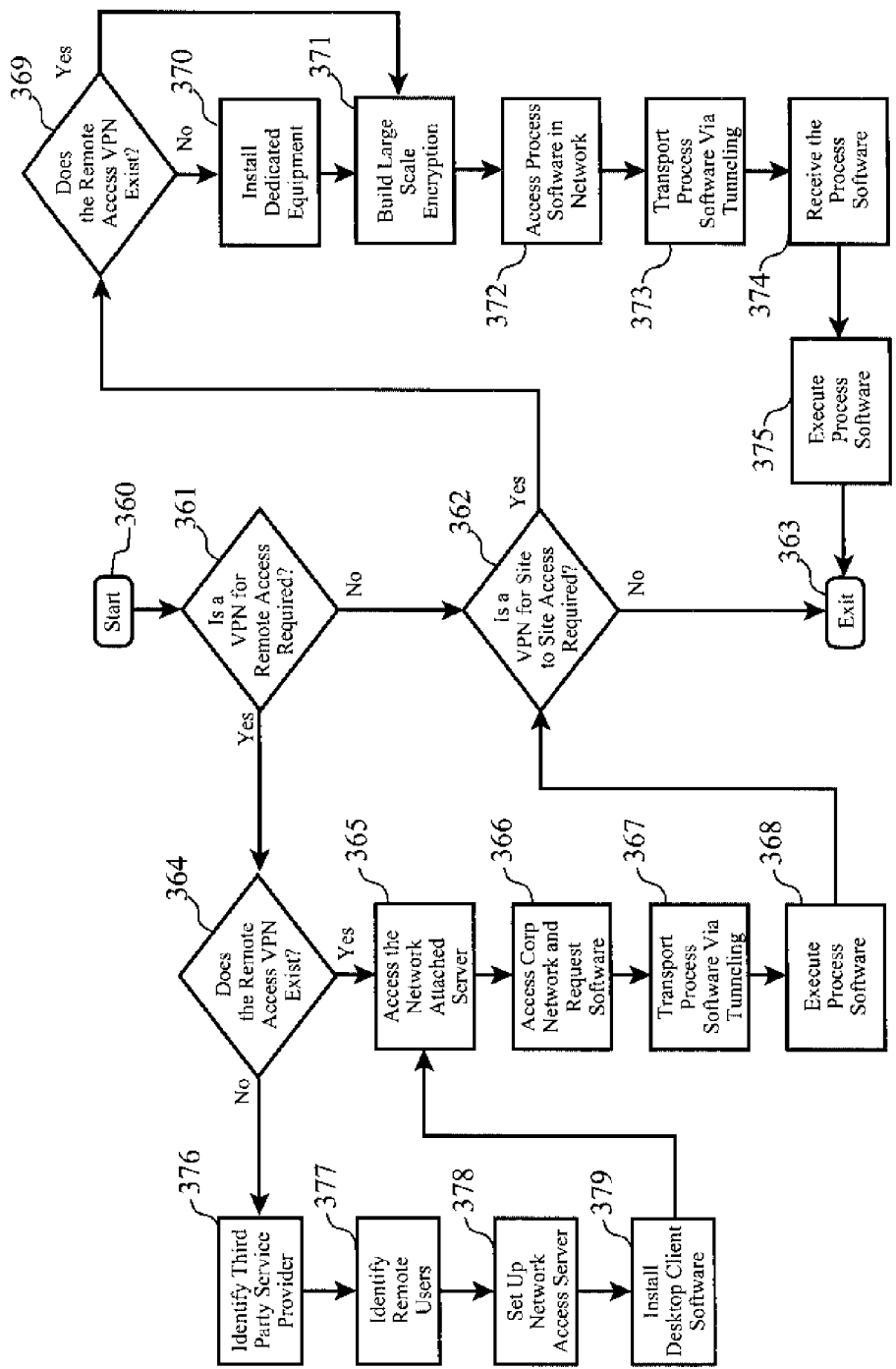
FIG. 3d sets forth a logical process to deploy software to a client via a virtual private network, in which the deployed software embodies the methods and processes of the present and related inventions.

Turning to FIG. 3d, VPN deployment process starts (360) by determining if a VPN for remote access is required (361). If it is not required, then proceed to (362). If it is required, then determine if the remote access VPN exits (364).

If a VPN does exist, then the VPN deployment process proceeds (365) to identify a third party provider that will provide the secure, encrypted connections between the company's private network and the company's remote users (376). The company's remote users are identified (377). The third party provider then sets up a network access server ("NAS") (378) that allows the remote users to dial a toll free number or attach directly via a broadband modem to access, download and install the desktop client software for the remote-access VPN (379).

After the remote access VPN has been built or if it has been previously installed, the remote users can access the process software by dialing into the NAS or attaching directly via a cable or DSL modem into the NAS (365). This allows entry into the corporate network where the process software is accessed (366). The process software is transported to the remote user's desktop over the network via tunneling. That is the process software is divided into packets and each packet including the data and protocol is placed within another packet (367). When the process software arrives at the remote user's desktop, it is removed from the packets, reconstituted and then is executed on the remote users desktop (368).

A determination is made to see if a VPN for site to site access is required (362). If it is not required, then proceed to exit the process (363). Otherwise, determine if the site to site VPN exists (369). If it does exist, then proceed to (372). Otherwise, install the dedicated equipment required to establish a site to site VPN (370). Then, build the large scale encryption into the VPN (371).

After the site to site VPN has been built or if it had been previously established, the users access the process software via the VPN (372). The process software is transported to the site users over the network via tunneling. That is the process software is divided into packets and each packet including the data and protocol is placed within another packet (374). When the process software arrives at the remote user's desktop, it is removed from the packets, reconstituted and is executed on the site users desktop (375). Proceed to exit the process (363).

CONCLUSION

While certain examples and details of a preferred embodiment have been disclosed, it will be recognized by those skilled in the art that variations in implementation such as use of different programming methodologies, computing platforms, and processing technologies, may be adopted without departing from the spirit and scope of the present invention. Therefore, the scope of the invention should be determined by the following claims.

What is claimed is:

1. An automated method comprising:
   accessing or receiving collected performance data for at least one server application, the server application being capable of performing a plurality of transactions with client devices, the client devices being geographically dispersed from a server executing the server application, each client device being located in a known geographical locale;
   automatically determining from the performance data which of the plurality of transactions are being utilized most by users of the client devices;
   selecting one or more of the most utilized transactions according to at least one pre-determined selection criteria;
   automatically generating a transaction playback script for each of the selected utilized transactions in which each playback script utilizes pre-determined test information in place of user-supplied or user-unique information in the transactions, each script being designated for execution from a geographical locale corresponding to the locale of the client devices which execute the utilized transactions;
   deploying the playback scripts to one or more transaction playback robots geographically co-located with the client devices according to the locale designation; and
   executing by the transaction playback robot script said the playback scripts thereby exercising the server application.

2. The method as set forth in claim 1 further comprising:
   monitoring the server application for changes in configuration; and
   responsive to detection of a change in the server application configuration, repeating the steps of accessing performance data, determining utilized transactions, selecting transactions, generating playback scripts, deploying scripts, and executing scripts.

3. The method as set forth in claim 1 further comprising updating one or more application response monitors to collect detailed transaction information for the utilized and selected transactions, followed by generating playback scripts, deploying scripts, and executing scripts.

4. The method as set forth in claim 1 wherein the collected performance data comprises hyper text transfer protocol server log information.

5. The method as set forth in claim 1 wherein the collected performance data comprises application response monitor data.

6. The method as set forth in claim 1 wherein the collected performance data comprises composite application monitor response time tracking data.

7. The method as set forth in claim 1 wherein the selection criteria comprises a frequency of transaction usage criteria.

8. The method as set forth in claim 1 wherein the selection criteria comprises a business value of transaction usage criteria.

9. The method as set forth in claim 1 wherein the selection criteria comprises a designated Uniform Resource Locator.

10. The method as set forth in claim 1 wherein the selection criteria comprises a performance level governed by a Service Level Agreement.

11. The method as set forth in claim 1 wherein the automatically determining from the performance data which of the plurality of transactions are being utilized by users of the client devices further comprises determining a period of peak utilization of the transactions, and wherein the automatically generating a transaction playback script comprises enabling the script to be executed by the playback scripts according to a schedule relative to the peak utilization period.

12. The method as set forth in claim 11 wherein the playback schedule is coincident with the peak utilization period.

13. The method as set forth in claim 11 wherein the playback schedule avoids playback during the peak utilization period.

14. An article of manufacture comprising:
a non-transitory computer-readable storage memory suitable for encoding of software; and
one or more software programs encoded by the non-transitory computer-readable storage memory and configured to cause a processor to perform:
  (a) accessing or receiving collected performance data for at least one server application, the server application being capable of performing a plurality of transactions with client devices, the client devices being geographically dispersed from a server executing the server application, each client device being located in a known geographical locale;
  (b) automatically determining from the performance data which of the plurality of transactions are being most utilized by users of the client devices;
  (c) selecting one or more of the most utilized transactions according to at least one pre-determined selection criteria;
  (d) automatically generating a transaction playback script for each of the selected utilized transactions in which each playback script utilizes pre-determined test information in place of user-supplied or user-unique information in the transactions, each script being designated for execution from a geographical locale corresponding to the locale of the client devices which execute the utilized transactions;
  (e) deploying the playback scripts to one or more transaction playback script robots geographically co-located with the client devices according to the locale designation; and
  (f) executing by the transaction playback robots the playback scripts thereby exercising the server application.

15. The article as set forth in claim 14 further comprising software encoded by the non-transitory computer-readable storage memory for:
  (g) monitoring the server application for changes in configuration; and
  (h) responsive to detection of a change in the server application configuration, repeating accessing performance data, determining utilized transactions, selecting transactions, generating playback scripts, deploying scripts, and executing scripts.

16. The article as set forth in claim 14 further comprising software encoded by the non-transitory computer-readable storage memory configured to update updating one or more application response monitors to collect detailed transaction information for the utilized and selected transactions, followed by performing generating playback scripts, deploying scripts, and executing scripts.

17. The article as set forth in claim 14 wherein the software for automatically determining from the performance data which of the plurality of transactions are being utilized by users of the client devices further comprises software for determining a period of peak utilization of the transactions, and wherein the software for automatically generating a transaction playback script comprises software for enabling the script to be executed by the playback scripts according to a schedule relative to the peak utilization period.

18. A system comprising:
an input portion of a computing platform for accessing or receiving collected performance data for at least one server application, the server application being capable of performing a plurality of transactions with geographically-remote client devices, the client devices being geographically dispersed from a server executing the server application and each having an identified geographic locale;
an analyzer portion of the computing platform configured to automatically determine from the performance data which of the plurality of transactions are being most utilized by users of the client devices, to select one or more of the most utilized transactions according to at least one pre-determined selection criteria, and to automatically generate a transaction playback script for each of the selected utilized transactions in which each playback script utilizes pre-determined test information in place of user-supplied or user-unique information in the transactions;
one or more transaction playback robots co-located in the geographic locales with the client devices; and
a script deployer portion of the computing platform configured to deploy the playback scripts to the one or more transaction playback script robots, each script being transmitted to a script co-located in a geographic locale with the one or more client devices from which the selected transactions were executed thereby causing the robots to receive and execute the playback scripts, exercising the server application according to the selected utilized transactions from the geographic locales.

19. The system as set forth in claim 18 wherein said analyzer portion is further configured to:
monitor the server application for changes in configuration and;
responsive to detection of a change in the server application configuration, to trigger the input portion to access performance data; and
to determine utilized transactions, to select transactions, and to generate updated playback scripts,
and wherein the transmitter is further configured to deploy the updated scripts, thereby updating scripts executed by the transaction playback robots.

20. The system as set forth in claim 18 wherein said analyzer portion is further configured to update configurations of one or more application response monitors to collect detailed transaction information for the utilized and selected transactions, followed by performing generating playback scripts, deploying scripts, and executing scripts by the input portion, analyzer portion, and transmitter.

21. The system as set forth in claim 18 wherein the analyzer portion is further configured to determine a period of peak utilization of the transactions, and to generate playback scripts which are enabling to be executed by the playback scripts according to a schedule relative to the peak utilization period.

* * * * *